United States Patent
Callaghan et al.

(10) Patent No.: US 10,423,710 B2
(45) Date of Patent: *Sep. 24, 2019

(54) BROWSER PLUG-IN WITH DOCUMENT MODIFICATION AND FEEDBACK CAPABILITY

(71) Applicant: Microsoft Technology Licensing, LLC, Redmond, WA (US)

(72) Inventors: David Michael Callaghan, Duvall, WA (US); Robert Devine, Kirkland, WA (US); Siddharth Banothu, San Francisco, CA (US); Christopher Sherry, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/145,002

(22) Filed: Sep. 27, 2018

(65) Prior Publication Data

US 2019/0034394 A1    Jan. 31, 2019

Related U.S. Application Data

(63) Continuation of application No. 15/337,355, filed on Oct. 28, 2016, now Pat. No. 10,095,671.

(51) Int. Cl.
*G06F 17/22* (2006.01)
*H04L 29/08* (2006.01)
(Continued)

(52) U.S. Cl.
CPC ...... *G06F 17/2247* (2013.01); *G06F 17/2252* (2013.01); *G06F 17/24* (2013.01);
(Continued)

(58) Field of Classification Search
CPC .................. H04L 41/0896; G06F 17/2235
See application file for complete search history.

(56) References Cited

U.S. PATENT DOCUMENTS 7,593,858 B2    9/2009   Matz et al.
7,853,558 B2 *  12/2010  Brindley ............... G06F 3/0487
                                                        707/608
(Continued)

FOREIGN PATENT DOCUMENTS

WO    2011109219 A1    9/2011

OTHER PUBLICATIONS

Vahl, Andrea, "6 Unique Ways to Target Your Facebook Ads", http://www.socialmediaexaminer.com/unique-ways-to-target-your-facebook-ads/, Published on: May 25, 2015, 23 pages.
(Continued)

*Primary Examiner* — Asher D Kells
(74) *Attorney, Agent, or Firm* — Jeffrey L. Ranck; Ranck IP Law

(57) ABSTRACT

Representative embodiments disclose a browser plug-in designed to conserve bandwidth, power or computing resources. The plug-in identifies links in a web page that retrieve additional data. In some embodiments, the additional data is retrieved and examined to obtain an identifier associated with the data. The identifier is then used to determine a course of action which could be to block the data, move the data or ask that future data comply with the interests of the user. The web page is rendered and displayed in accordance with the decision. In other embodiments, prior to receiving data, the browser plug-in sends information to identify data of interest or disinterest and in response, receives data chosen based on the interest or disinterest, thus refraining from downloading irrelevant data. In still other (Continued)

embodiments, prior to receiving the data, the browser plug-in sends information indicating the data will not be retrieved.

20 Claims, 11 Drawing Sheets

(51) Int. Cl.
*G06F 17/24* (2006.01)
*H04L 12/24* (2006.01)

(52) U.S. Cl.
CPC .......... *H04L 41/0896* (2013.01); *H04L 67/02* (2013.01); *H04L 67/22* (2013.01); *H04L 67/2847* (2013.01); *H04L 67/306* (2013.01); *G06F 17/2235* (2013.01)

(56) References Cited

U.S. PATENT DOCUMENTS

| | | | |
|---|---|---|---|
| 8,386,318 B2 | 2/2013 | Varadarajan et al. | |
| 8,843,406 B2 | 9/2014 | Aven et al. | |
| 9,213,777 B2* | 12/2015 | Chan | G06F 16/958 |
| 2003/0110272 A1* | 6/2003 | du Castel | H04L 29/06 |
| | | | 709/229 |
| 2003/0212619 A1 | 11/2003 | Jain et al. | |
| 2005/0022116 A1* | 1/2005 | Bowman | G06F 16/986 |
| | | | 715/234 |
| 2005/0033849 A1* | 2/2005 | Matz | H04L 29/06 |
| | | | 709/228 |
| 2006/0235960 A1* | 10/2006 | Lai | G06Q 30/02 |
| | | | 709/224 |
| 2007/0133034 A1* | 6/2007 | Jindal | G06F 16/9535 |
| | | | 358/1.14 |
| 2009/0192888 A1 | 7/2009 | Barton et al. | |
| 2010/0042424 A1* | 2/2010 | Turakhia | G06Q 10/107 |
| | | | 705/14.54 |
| 2010/0268682 A1* | 10/2010 | Lewis | G06Q 10/107 |
| | | | 706/54 |
| 2010/0318426 A1* | 12/2010 | Grant | G06Q 20/10 |
| | | | 705/14.66 |
| 2012/0197734 A1 | 8/2012 | Deluca | |
| 2012/0198321 A1* | 8/2012 | Serena | G06Q 30/02 |
| | | | 715/205 |
| 2012/0209963 A1* | 8/2012 | Patel | G06F 16/958 |
| | | | 709/219 |
| 2013/0145255 A1* | 6/2013 | Zheng | G06F 17/211 |
| | | | 715/234 |
| 2014/0006150 A1 | 1/2014 | Thompson et al. | |
| 2014/0279595 A1* | 9/2014 | Senaratna | G06Q 10/10 |
| | | | 705/317 |
| 2015/0026172 A1* | 1/2015 | Adekile | G06F 16/958 |
| | | | 707/732 |
| 2015/0348119 A1 | 12/2015 | Ferber et al. | |
| 2016/0189248 A1* | 6/2016 | Boyle | G06Q 30/0277 |
| | | | 705/14.73 |
| 2017/0373997 A1* | 12/2017 | Deng | H04L 51/12 |

OTHER PUBLICATIONS

"Facebook Dynamic Ads", https://www.facebook.com/business/a/online-sales/dynamic-product-ads, Retrieved on: Oct. 5, 2016, 11 pages.

Brad, "Targeted Ads after I buy something are really annoying", http://ideas.4brad.com/targeted-ads-after-i-buy-something-are-really-annoying, Published on: Mar. 5, 2015, 4 pages.

"Why do I see ads for things I have already purchased?", https://www.quora.com/Why-do-I-see-ads-for-things-I-have-already-purchased, Retrieved on: Oct. 5, 2016, 5 pages.

Grosskurth, Alan and Godfrey, Michael W., "Architecture and evolution of the modem web browser", Davis R. Cheriton School of Computer Science, University of Waterloo, Waterloo, ON N2L 3G1, Canada, 2006, 24 pages.

"How Ad Serving Works—Mobile Vs. Web Environments", http://www.adopsinsider.com/ad-serving/how-ad-serving-works-mobile-vs-web-environments/#more-1663, Aug. 26, 2013, 13 pages.

How Does Ad Serving Work?, http://www.adopsinsider.com/ad-serving/how-does-ad-serving-world, Sep. 3, 2010, 37 pages.

* cited by examiner

BROWSER PLUG-IN WITH DOCUMENT MODIFICATION AND FEEDBACK CAPABILITY

FIELD

This application relates generally to web browsers and web browser plug-ins. More specifically, the application relates to a plug-in for web browsers that conserve network bandwidth and device power by providing upstream information to content providers so they do not download as much irrelevant content or by blocking irrelevant content.

BACKGROUND

When a web page is loaded into a browser, content can be pulled from multiple locations in order to gain all the information referenced by the web page so that the web page can be rendered. Modern web pages are generally comprised of a variety of different types of information that relate to various different things. For example, a typical web page may comprise one or more main items of interest such as a news article, story, blog post, or other item, ancillary items such as the local weather, sports scores, or other items, navigation or other mechanisms to navigate to different posts, stories, articles, and so forth, advertisements for various items, subscriptions, and so forth, links to other sites, web pages, and a vast array of other information. A typical web page can require many of these items to be pulled from widely different data sources. Sometimes finding and retrieving an item requires the browser to go through multiple redirects to track down the present location of the items to be downloaded. Furthermore, much of the content associated with a web page holds little or no interest to the user who requested the web page.

Because of the numerous data sources and rich content of the various items, much time and bandwidth can be required to retrieve all the data prior to rendering a web page. This translates into increased power consumption and the additional content slows down web page rendering. For mobile devices and/or devices that operate on battery power, this translates into higher bandwidth costs and/or reduced runtime. Furthermore, any unwanted content downloaded from the web will be stored in the web browser cache which consumes file system free space and can cause additional wear on the FLASH memory devices. Lastly some of the content displayed may be offensive to the sensitivities of the user.

It is within this context that the present embodiments arise.

BRIEF DESCRIPTION OF DRAWINGS

FIG. 6 illustrates an example flow diagram for selecting actions according to operation of a browser plug-in.

DETAILED DESCRIPTION

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

Figure 1:
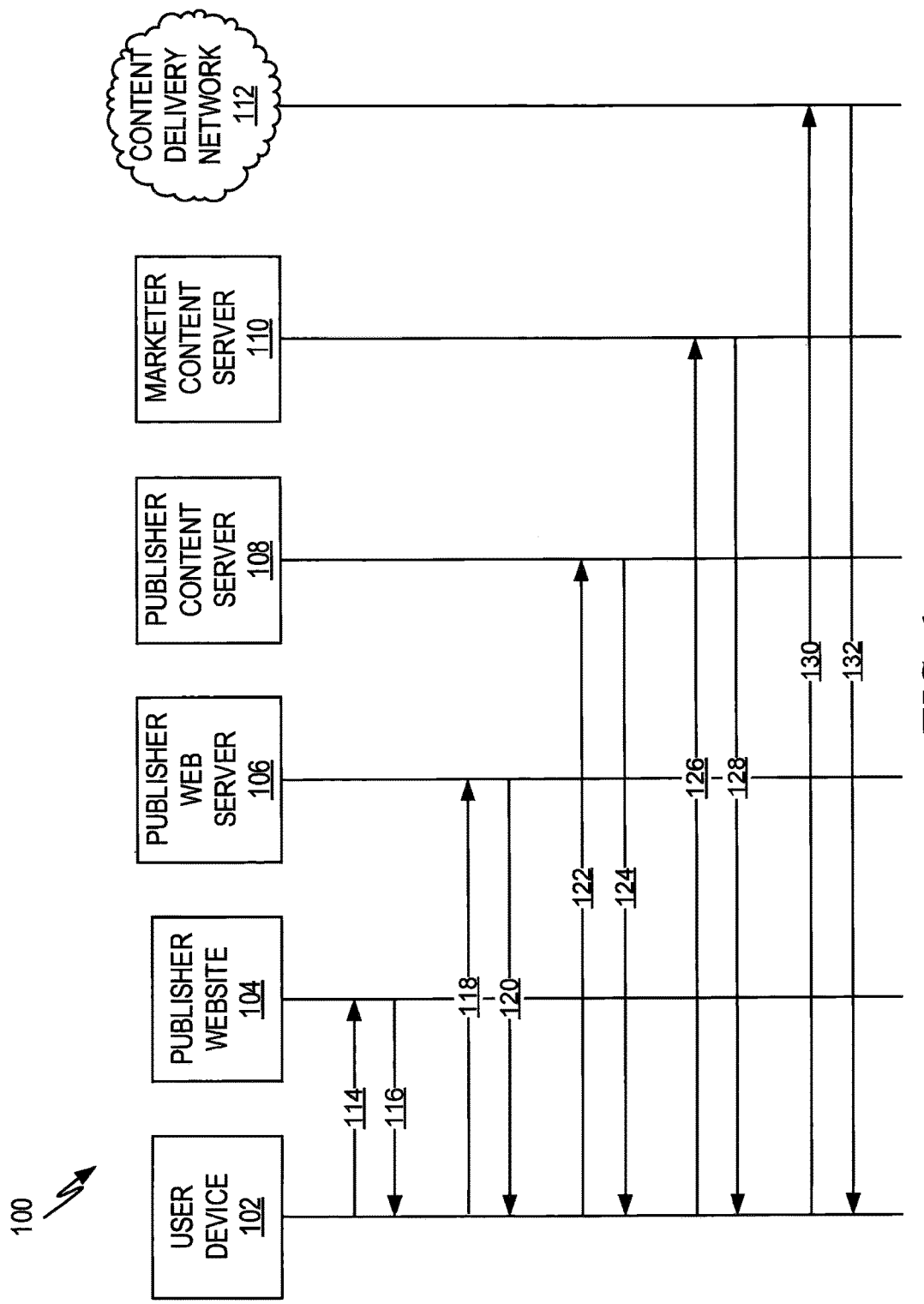
FIG. 1 illustrates an example set of data exchanges to pull down information from multiple sources before a web page can be rendered.

The wide variety of data sources in a typical web page lead to loading delays and use bandwidth, power and other computing resources to retrieve data that has little interest to a user or relationship to the content that is of interest on the web page. As a representative example, FIG. 1 illustrates a set of data exchanges 100 to pull down information from multiple sources before a web page can be rendered. A user, using a browser on a user device 102 navigates to a publisher website 104 as indicated by data exchange 114. The publisher website 104 sends back a markup language document, such as an HTML web page as indicated by data exchange 116. The HTML code in the web page tells the browser how to get content, from the publisher web server 106 and how to format it. The browser initiates data exchange 118 requesting the data from the publisher web server 106 and receives the content in return in data exchange 120.

In some instances, the publisher hosts its own content servers 108, in addition to the web server. Thus, some content may be served by the publisher web server 106 and some content may be served from the publisher content servers 108. For the content served by the publisher content servers 108, the publisher web server 106 redirects (i.e., HTTP 302 redirect) the browser to the publisher content server 108 in order to retrieve the data hosted there. This results in a further data exchange 122/124.

As web pages typically pull data from multiple sources, further links in the HTML code are used to pull data from other sources. Such sources can be any number of sources. For example, weather services offer data feeds describing the local weather and the publisher can embed a link to retrieve the weather data from the weather data provider. Sports scores can be served and retrieved from sports score providers, and so forth. Each of these data sources requires the browser to initiate another data exchange with another data provider. Sometimes the data provider will contract with others to serve actual content so a number of redirects that tells the browser that the actual content the browser is requesting has been moved and the browser needs to retrieve it from yet another source. Each redirect introduces yet another data request/response exchange with yet another server. Users scrolling to the bottom of a visible page can trigger another content retrieval so that in effect the page is an infinite scrolling action pulling down additional content article or scrolling through chronological postings to a social networking site.

To illustrate the number of redirects in a typical scenario, FIG. 1 can be used to illustrate a representative example of advertising content. In this example the publisher content server 108 can be a news aggregator site that crawls other information sources and aggregates them into a long feed that can be dynamically fetched as the user scrolls down and include other content from publisher ad server (which will be referred to as 108 for the purposes of this example). Similarly the marketer content server 110 can be a marketer ad server 110 and the content distribution network 112 can be a large content server provider, such as Akamai or other content provider network.

In the ad serving example, a publisher web server 106 can return a coded link known as an ad tag, which directs the web browser to an ad server. Ad tags can take on many different forms. For example, the ad tag may contain a coded link of the form:

http://big.adprovider.net/ADJ/publisher/zone;topic=abc; sbtpc=def;cat=ghi;kw=xyz;tile=1;slot=728×90.1; sz=728×90;ord=7268140825331981?

Where: http://big.adprovider.net/ is the host address for the ad server

/ADJ is a code that defines a specific type of ad call and what the response can be, such as XML vs. scripts.

/publisher is the site that the ad provider uses to distinguish one publisher property from another.

/zone is akin to a channel level so the homepage vs the arts page vs the sports page. In other words, it is a broad category of ad type.

topic=abc is the next level (i.e. topic level) in the category hierarchy.

sbtpc=def is the subtopic level in the category hierarchy.

kw=xyz is a way to describe the page for contextual targeting. Multiple keywords are allowed and are typically used in guides and directories. For example if the publisher wanted to target chicken recipes vs. vegetarian recipes vs. winter recipes, etc. They allow some overlap targeting.

tile=1 is a variable that sets a unique value for each ad call on a specific page.

slot=728×90.1 typically defines the location of the ad tag, but can be another type of key-value pair.

sz=728×90 defines the ad size of the unit for the ad server logic. This doesn't restrict the size of the ad in the unit, just provides a targeting attribute for the ad server.

ord=7268140825331981 is a random value that prevents browsers from caching the ad and reloading the same ad multiple times.

? is a separator indicator.

The ad tag points the browser to the publisher ad server 108, which is designed to deliver and track advertising (i.e., data exchange 112/124). In some cases, the publisher ad server 108 is a separate company from the entity that operates the publisher website and publisher web server. The publisher ad server 108 makes a decision on what ad to serve and sends back another ad tag (the marketer's ad tag) and/or redirects the browser by pointing it to the marketing ad server 110. The browser calls the marketer ad server 110 (data exchange 126/128) and again is redirected to a content delivery network 112, that specializes in hosting an entity's content and delivering the content when requested. The redirect to the content delivery network typically looks like a link to retrieve a type of file, such as:

http://spe.contentdeliveryprovider.com/ds/AB-CDEF12334/filename123_300×250.swf

In addition to sending back a redirect to the content delivery network 112 (i.e., data exchange 130), the marketer ad server 110 can append a second redirect back to itself with a query string to fetch a tracker (i.e., 1×1 pixel) from the marketer ad server 110. This lets the marketer ad server 110 know that the ad download from the content delivery network 112 was successful (i.e., data exchange 132). This additional redirect would be returned in data exchange 132 to the browser and result in yet another redirect and data exchange (not shown) between the browser and marketer content server 110.

All this happens before the web page can be rendered and takes up time, bandwidth and computing resources on user device 112.

Although the ad serving context represents a large number of redirects between servers, as indicated above, serving content of any kind from multiple servers results in redirects and downloads from multiple locations. Thus, any type of content that is not of interest to the user represents an ineffective use of time, bandwidth and computing resources.

Embodiments disclosed herein are directed to browser plug-ins that preclude downloading of unwanted and/or undesired content in order to reduce time, bandwidth and computing resources (such as compute cycles, RAM memory, FLASH and/or disk storage and batter charge and/or AC/DC power) to download web pages and other documents that retrieve data from multiple sources prior to rendering. These plug-ins are different from so called ad blockers because the plug-ins work with servers to identify content that is of interest to users so that as content is downloaded, it is relevant to the user. This not only precludes downloading of irrelevant data and/or reduces the number of redirects, time, bandwidth and computing resources (such as compute cycles, RAM memory, FLASH and/or disk storage and batter charge and/or AC/DC power), but also helps ensure that information that is downloaded is of interest to the user. Thus, the user does not have to download irrelevant data and the server is helped to know what information is relevant, thus providing a benefit for the user, the machine and the server.

A list of identifiers of areas of interest, disinterest or both are kept under user control, either locally to the user's machine or in a trusted cloud location so they can roam with the user. The user can add, delete, modify and otherwise change these areas of interest as well as manage who they share the information with. These areas of interest/disinterest can represent categories, in some type of category hierarchy, specific items, and so forth. Embodiments of the disclosure can function with any level of granularity of the list(s) (i.e., at what level interest and/or disinterest is expressed). In some embodiments, a mapping can be established to map interest/disinterest at one level to areas at a different level. For example, if areas in a list comprise categories at one level (astronomy, dogs, beekeeping) an identifier from another level (Saturn, Belgian Malinois, beehive design), matching can be determined by whether the broader level encompasses or is related to the narrower level (or vice versa). The list of identifiers can also contain other user configured entries such as city, state, country, address, age, gender, annual income, marital status, language, education, professional group affiliations, access to social networking sites like Facebook and/or LinkedIn profiles etc. that describe information about a user. Such information can also be used by the plug-in and/or another system to derive areas of interest/disinterest, such as by mining information related to the user. For example, if the user gives the plug-in their account information to a shopping site, the plug-in can download purchase history information and the plug-in can extract identifiers of interest and/or disinterest from the purchase history. As another example, a Facebook and/or LinkedIn profile can provide information that the plug-in can use to extract and/or derive areas of interest/disinterest along with associated identifiers.

The HTML (or other markup language) in the document is examined and links that download additional content are identified. Once the link(s) is identified, the link is further examined and an identifier(s) is extracted from either the downloaded content, the link, or from metadata associated with one, the other or both. The extracted identifier(s) is compared to identifiers in the list(s). When a match is detected, the system decides on one or more actions to take. The action may be to block the data, modify the data in some fashion or relocate the data to a different location in the document, combinations thereof, and/or some other action.

Once an action(s) is determined, the system implements the action and then informs the server (or another server) what action was taken, the reason behind the action, suggest a different course of action for the server, or combinations thereof. This lets the server know the action taken by the plug-in and gives the server an opportunity to modify its behavior.

For example, the plug-in may identify data that is on a "disinterested" list and determine to block the data. The data can be blocked, for example, either by not retrieving the data or, if the data is already retrieved, by not displaying the data. The plug-in can then inform the source of the data that the data has been blocked and/or the reason for the blocking (i.e., the data was on a disinterested list).

In another example, the plug-in can modify the data. For example, the plug-in modifies the link that retrieves the information to include information on what would be of interest. In either case, the server can decide to refrain from sending information that it knows is irrelevant to the user. This may result in the server sending no data or may result in the server sending less data. For example, if the server is an ad server or news server and had identified a set of data (GIFs, text, etc.) to send down to the user that will be displayed in a rolling "carrousel" display, and some of the data is not of interest, the server may reduce the set of data to only that which is of interest (or at least not of disinterest) to send to the browser so that overall less data is received by the browser and irrelevant data is not received.

In another example, the plug-in relocates the information. Thus, if information that is not of interest is destined to be presented "above the fold" in a web page, the system can relocate it "below the fold" and either leave its original location blank or move more relevant information to replace it above the fold.

Description

Figure 2:
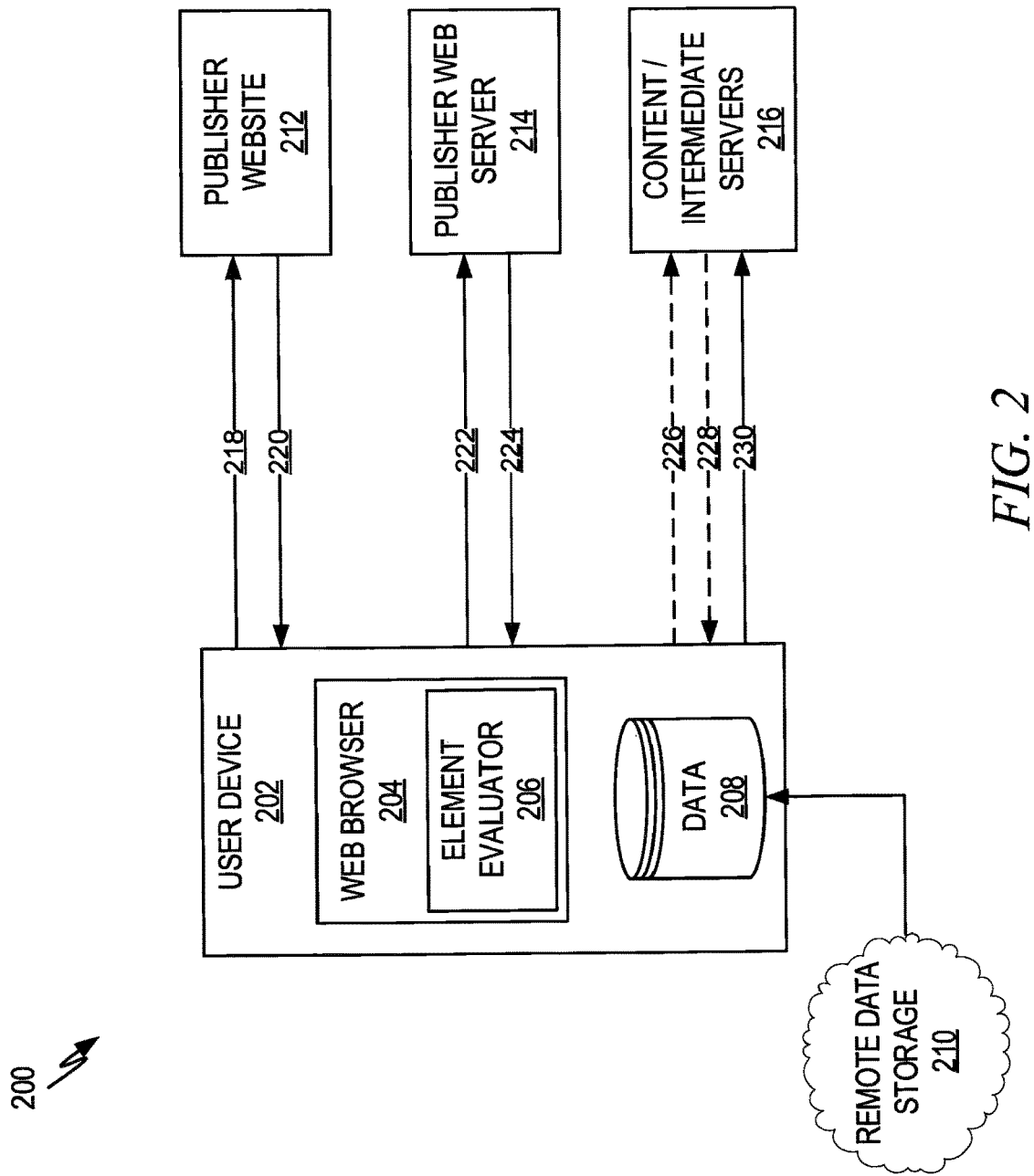
FIG. 2 illustrates an example architecture diagram of a browser plug-in that reduces bandwidth requirements.

FIG. 2 illustrates an example architecture diagram 200 of a browser plug-in that reduces bandwidth requirements. User device 202 comprises a browser 204 or other program, application and/or so forth that is designed to display documents such as web pages downloaded across a network. The browser 204 comprises a plug-in, such as element evaluator 206. The element evaluator 206 evaluates documents that are downloaded from the network and identifies portions of the document that contain instructions to download further information from the network. For example, a web page comprises links, scripts, and other elements that retrieve information for incorporation into the web page when it is rendered. Element evaluator 206 looks closer at these elements and identifies information about the location where the content is downloaded from and/or the content itself. In a representative embodiment, the element evaluator 206 extracts one or more identifiers from the link, script, downloaded information, metadata regarding any of the foregoing, and/or combinations thereof.

The element evaluator 206 accesses one or more lists that comprise identifiers that represent areas the user has an interest in, disinterest in, or a combination of both. For example, one list can comprise identifiers that describe areas the user is interested in. As another example, a list can comprise identifiers that describe areas the user is not interested in. In another example, both lists are available. In yet another example, a single list exists that combines identifiers that describe areas the user is interested in and identifiers that describe areas that the user is not interested in.

In the context of the disclosure, the lists are described as having identifiers that represent areas of interest/disinterest. The term "areas" is intended to cover not only a general "region" of interest, such as a category, subcategory, sub subcategory, and so forth, but also individual items. In other words, an area of interest can be any level of a taxonomy and can cover a broad category such as "cars" but also can cover a particular item in that category such as "Ford® Mustang®." An area of interest/disinterest can also describe a type of data. Types of data can include a broad category (such as weather, sports, advertisements, and so forth). Thus an area of interest/disinterest can be described any level of granularity (i.e., at what level interest and/or disinterest is expressed). Furthermore, all lists do not have to be at the same level of granularity. Additionally, or alternatively, the list does not have to be a list, but can represent a hierarchical taxonomy of interests and/or disinterests.

The lists described are stored in a data store under the user's control. Thus the user can add things to the lists, remove things from the lists, delete the lists and other such operations. This places the data in the lists under the control of the user and allows the user to decide what, if anything, is placed on the lists and whether any particular identifier in the list represents an interest or a disinterest. Representative examples of locations under the user's control comprise data store 208, which is local to the machine and/or trusted cloud storage, such as remote data storage 210. Storing the lists in trusted remote storage allows the data to roam with the user, so the data can be utilized by the user on machine that isn't necessarily the user's own machine. For example, the lists can be part of a roaming user profile that is used wherever the user is logged on.

The user can interact with a configuration application that asks a series of questions to obtain specific information about the user and their interests. The user can grant permission for an agent to query their social networking and professional networking sites like Facebook and LinkedIn to obtain additional information about the user without the user having to type in the individual data values. Artificial Intelligence agents can scan the users likes/dislikes to gain insights into topics the user finds likeable as well as disinterests. The system can present the data set via a user interface and edit/add/modify/delete identifiers that relate to areas of interest from the lists. Additionally, or alternatively, the user interface can allow the user to control which sites will be filtered for inclusion and/or exclusion based on the user preferences and configure sites that will not be filtered. In other words, the plug-in can hold preferences on a per-website basis at any particular level, so that the plug-in may filter some websites or web pages on a particular site and not filter other websites or other web pages on a particular site. Furthermore, different websites and/or web pages can be filtered using different criteria. Thus, some actions may be applicable to some websites/web pages and not others. Different identifier lists can be used for different websites/web pages and so forth. In other words, in embodiments of the present disclosure, a user can customize how the plug-in treats different websites, web pages, and so forth.

The plug-in allows the user to backup, restore as well as delete subsections or parts of the lists or all the list data. These interests and non-interests can be lists or lists of topics belonging to a hierarchical organization or simply keywords descriptive of the user's interests and non-interests. The lists can be associated with profiles for users such as elementary school, child, adult, teen, and so forth and prepopulated with topics typically associated with a demographic and learn over time based on the user's feedback that areas were of interest or not to provide a more personalized web experience.

Additionally, or alternatively, the lists can contain not only identifiers, but some indication of how strong the like or dislike for that identifier. For example, the list can be in ranked order so that the identifiers at the top of the list represent a stronger like or dislike than identifiers at the bottom of the list. Alternatively, identifiers in the list can contain a strength indicator that rates, on a scale (i.e., 1-5, 1-10, etc.) how strong a like and/or dislike the user has for that particular area of interest. Likes and dislikes can be kept in different lists or both can be kept in the same list. For example, if presence on the list indicates like or dislike (i.e., there are different lists for like/dislike), then an entry in the list may comprise the identifier and an optional strength indicator. For lists that are sorted by like and/or dislike, the indicator may be redundant to the rank order of the item in the list. For lists that combine like and dislike identifiers, an entry can comprise an identifier, a like or dislike flag and an optional strength indicator. Again, the ranking on the list may indicate like and/or dislike for lists kept in rank order. Alternatively, the strength indicator itself can indicate like/dislike. Thus, a 1-10 scale may be used for a strength indicator, where 1 indicates strong dislike and 10 indicates strong like, with the like/dislike boundary laying between 5 and 6. Other schemes are also possible to represent an area of interest, whether the area of interest is liked or disliked by the user and an optional indicator of the strength of like and/or dislike.

The list can be stored in an appropriate data structure that allows searching and comparison by the element evaluator 206. For example, one or more tables in a database would be an appropriate solution. In another example, a searchable structure such as a hash set or tree, or another searchable data structure would also be an appropriate solution. In yet another example, the data could be presented to the element evaluator 206 in any common browser data structure such as (but not limited to) JSON, XML or the like. In a further example, the lists can be tabular lists grouped by category and column of interest and disinterest. The inclusion (i.e., like) and exclusion (i.e., dislike) lists can be managed separately or combined and edited by other tools like features built into the plug in, as well as additionally using word processors, spreadsheets, web sites, and other commonly used information management tools.

In operation, the user browses to a web page from a publisher. This results in the browser making a request 218 for the web page from the publisher website 212. The publisher website 212 either returns the requested web page or redirects the browser to the publisher web server 214, i.e., in data exchange 220. If the browser was redirected, the browser requests the web page from the publisher web server 214 in request 222. The publisher web server 214 responds with the web page in response 224.

Once the web page is returned to the browser, the element evaluator 206 examines the web page and identifies elements that may contain data that should be subject to blocking, and other actions as described herein. In one example, elements that request any further data, i.e., from intermediate/content servers 216 can be examined to determine if further action should be taken. As previously discussed, these may be indicated by various elements in the web page, such as links, scripts and so forth. The element evaluator 206 can rely on parsing done by the browser and examine, for example, the document object model (DOM) for elements that request further data. In another example, elements that do download additional data can be subject to additional action like blocking, relocation and so forth as described herein.

The elements that request further data, i.e., from intermediate/content servers 216 or that may relate to areas that are liked/disliked, are examined and identifiers extracted therefrom. Sometimes the host address where the data is to be retrieved allows the element evaluator to extract an appropriate identifier. For example, if the host address is one registered to the National Oceanic and Atmospheric Administration (NOAA), an identifier related to weather may be extracted. Similarly, if the website is known to provide photographs taken by the Hubble Telescope, an identifier related to astronomy may be identified. Other times, identifiers can be drawn from the various parameters associated with a link, such as the various ad link parameters identified above. In still other examples, identifier(s) can be extracted from metadata, information associated with an element or information in the element itself. Such an approach can help identify elements relating to areas of interest/disinterest that do not download additional data from other web sites.

To identify areas of interest/disinterest, the element evaluator 206 compares the extracted identifiers to the identifiers in the one or more lists to determine matches between the identifiers. Because the identifiers in the lists are not necessarily at the same category level, a match can be identified in a few different ways. An identical match would be considered to be a match. In another embodiment, only similarity between two identifiers is required to identify a match. Similarity can be determined in multiple ways. For example, stemming can be used to reduce words to their stem, base or root form. The root forms can then be compared to identify a match. One suitable implementation would be to store stems in the lists and convert extracted identifiers to their stem for comparison to the stems in the lists. Another suitable implementation would be to stem both identifiers in the lists and extracted identifiers on the fly before comparison. Algorithms to convert words into their stems are well known and need not be repeated herein. Common misspellings, letter transpositions, language differences (such as between British English and American English) and so forth can also be taken into account when determining matches, stemming and similarity.

For identifiers at different category levels, a match is sufficient if one identifier is encompassed by the other. For example, a match between the identifier "sports" is matched by any particular type of sport (i.e., "cycling" or "baseball"). Such a match can be identified, for example, by a taxonomy of categories/identifiers, a relationship structure, or by any other such mechanism.

If the element evaluator identifies an area of interest from the extracted identifier, it allows the browser to retrieve the data. In the alternative, if the system can identify an area of disinterest from the extracted identifier, it can take a different action, such as blocking the information, making a modification to the link and/or other information, relocate the element, and/or other actions as described below.

In some instances, the identifiers extracted from the element (link, script, etc.) do not a match or do not provide sufficient information to allow the plug-in to make a decision as to whether a match exists or not. In these instances, the element evaluator 206 allows the browser 204 to download the data and then evaluates the downloaded data to extract identifiers from the data itself or from metadata. Once data is downloaded, its content can be evaluated to extract identifiers. For example, if the downloaded content contains textual information the text can be evaluated and identifiers extracted from the text, such as by eliminating common or "noise" words and then checking the remainder against the interest/disinterest lists. If the downloaded information does not yield to analysis, such as when the information is a graphic that cannot be identified (i.e., through image analysis) or some other sort of rich media like video, then metadata associated with the data can be examined to extract identifiers that are able to be compared against the interest/disinterest list. Metadata includes information such as file name, file type, category information, and other metadata related to the downloaded information. Other sources of metadata are alternate or keyword tags such as the HTML markup img alt attribute which provides a text description of an image. Accessibility features incorporated into webpages such as aria-described by attribute is yet another example of the rich metadata available for the plug in to make the ultimate inclusion or exclusion and layout decisions described in more detail further below. Other examples of metadata include LONGDESC which can be used to provide a hyperlink to a detailed description of the image.

When a match is determined, the element evaluator 206 can select one or more actions to be performed based on whether the user has interest and/or disinterest in the information. Actions include blocking the data, presenting the data in modified form, relocating the information on the page, and/or other such actions. Actions can be performed by manipulating the DOM, the underlying HTML, the link and other such elements. Although a wide variety of actions may be performed, the actual implementation tends to fall within one of three main categories. These categories are summarized and then discussed in greater detail below.

The feature of indicating interests or disinterests can be enabled and disabled by the user at any time using the plugin control panel settings. In addition, the device can be configured to automatically enable or disable the feature based on remaining battery capacity or other indicators such as the size of data remaining in the users wireless account available for downloading. The system can also be configured to enable/disable the feature when on wifi vs. cellular, plugged into AC or on battery etc.

The first category of action that can be taken is to delete the element all together. This means that an element in the DOM, the HTML or the link itself can be deleted and the remainder fixed up as necessary (i.e., through code injection or modification of the existing code) to ensure no errors are created when the web page is rendered. Additionally, or alternatively, rather than delete the entire element, the content associated with the element can be deleted. The second category of action that can be taken is to relocate an element on the page. Thus, content that is of interest can be given more prominence on the page and/or content that is not of interest can be moved to a location that deemphasizes it. The final category of action that can be taken is to modify the element/link so that it either retrieves different information or has information of disinterest removed. Additionally, or alternatively, the plug-in can provide an area of interest to the server so that the server can send more relevant information (or less information that is not of interest) in place of information that is not of interest to the user.

While all three of these actions result in modification of elements (DOM, HTML, link, etc.) in some fashion, they are treated differently because they are different sorts of modifications and can achieve different desired results. The details of these actions are described below.

Once the element evaluator selects one or more actions to perform, a series of data exchanges are performed between the web browser 204 and the content/intermediate server(s) 216. The content and sequence of the data exchanges will vary depending on the action(s) taken and the content itself. The following represents just some of the possibilities.

In a first example, the element evaluator 206 extracts information from the link prior to downloading the content and the matching process described above determines that the referenced content would not be of interest. In this situation, the element evaluator 206 can, through the web browser 204, signal to the content/intermediate server(s) 216 that the content is not of interest and has been blocked. This is represented by data exchange 230. It can be performed by modifying the link used to retrieve the data and appending a parameter that signals to the content/intermediate server that the information is not of interest and will be blocked. In a representative example, a parameter such as "&userNotInterested" can be appended. For example, if the content were an advertisement link of the form listed above, the "&userNotInterested parameter can be appended to achieve something like:

http://big.adprovider.net/ADJ/publisher/zone;topic=abc;
     sbtpc=def;cat=ghi;kw=xyz;tile=1;slot=728×90.1;
     sz=728×90;ord=72681408253319981? &userNotInterested In another representative example, the URL itself can be modified. In a URL of the form above, the topic parameter can be changed from "topic=abc" to replace "abc" with an indicator that the topic is not of interest. For example, "topic=abc_userNotInterested." In yet another example, the URL can be modified in other ways, such as appending "/userNotInterested" to the pathname such as "http://big.adprovider.net/ADJ/publisher/zone/userNotInterested" and the remaining parameters can be the same as listed above.

The intent of this discussion is to illustrate that there are several ways to modify the URL to achieve the desired effect and any of the ways described herein can be used in any of the described embodiments. Thus, while the remaining examples in this discussion all describe a parameter of the form "&parameter" or "&parameter=value", the URL can also be modified in one of the ways above, such as changing the pathname, appending to the pathname, changing a parameter, adding a parameter, and so forth.

The content/intermediate server(s) 216 that receive the modified link can parse the link and can identify the action selected (i.e., content will be blocked) and determine the reason for the action (i.e., user is not interested). The content/intermediate server(s) 216 can then determine to return data that would be of interest, or can simply update its state graph for the user and determine that downloaded information in the future will not contain the items that were found to be not of interest to the user. In this situation, further exchanges (i.e., data exchanges 226/228) are modified and/or eliminated altogether, thus conserving time, bandwidth and/or computing resources for the user device 202.

For content/intermediate server(s) 216 that do not understand the appended parameter or modified link, they will either ignore the parameter they do not understand or simply not "find" any data in their system that corresponds to the link and will not download any data. If the server ignores the parameter and sends the data anyway, the plug-in can decide to block the data as described herein. If the server responds with an "error" (i.e., 404 error or other data not found indication) may be returned to the web browser 204, the web browser 204 will handle the error without any special modifications. Thus this implementation has the benefit of not breaking existing standards of operation if a content/intermediate server 216 is unable to interpret the link. In other words, users can install the element evaluator 206 plug-in without fear of making their system incompatible with existing network infrastructures.

In addition to modification of the link to express disinterest in the content, the element evaluator 206 can block the content from being displayed, such as by presenting a blank space where the downloaded data would reside, eliminating the element from the DOM/HTML code, move other layout content to fill the otherwise empty block and/or other actions as further discussed below.

In another example, if the element evaluator 206 could not find a match in the interest/disinterest lists for extracted identifiers or if the element evaluator 206 is unable to extract an identifier from the link prior to downloading content, the content may be downloaded such as through data exchanges 226/228 and identifiers extracted from the downloaded content itself and/or metadata/tags associated with the downloaded data as previously explained. In this situation, data exchange 230 can be a "feedback" to the content/intermediate server(s) 216 to identify the action taken and/or the reason therefore.

Similar data exchanges can happen for other actions. For example, if the content is displayed, but relocated, then data exchange 226 can represent a request for the data, perhaps with an appended parameter that informs the content/intermediate server(s) 216 that the content will be relocated. In that instance, exchange 228 can be the requested data and exchange 230 need not happen. Alternatively, data exchange 226 is a request for the data using an unmodified link, data exchange 228 is the requested data and data exchange 230 informs the content/intermediate server 216 that the content has been/will be relocated and/or the reason therefor.

In yet another example, the element evaluator 206 can identify that the content specified by the link is of interest. The link can be modified, such as by appending a parameter that indicates an area of interest to the user. This modified link is used in data exchange 226 and conveys the area of interest to the content/intermediate server(s) 216. As an example, the element evaluator 206 could change a link from the example above, i.e.:
  http://big.adprovider.net/ADJ/publisher/zone;topic=abc;
    sbtpc=def;cat=ghi;kw=xyz;tile=1;slot=728×90.1;
    sz=728×90;ord=72681408253319817?
to a new query with suggested categories and new parameters or simply updating previous parameters or any of the other possible permutations and or combinations thereof such as:
  http://big.adprovider.net/ADJ/publisher/zone;
    suggestedtopic=jkl;sbtpc=mno;suggestedcat=pqr;
    notcat=ghi;kw=stu;tile=1;slot=728×90.1;sz=728×90;
    ord=72681408253319817?NewSuggestions The content/intermediate server(s) 216 responds with data in data exchange 228. If the data falls into the area of interest, the data can be displayed and exchange 230 can inform the content/intermediate server 216 of success (i.e., data displayed) or can simply be eliminated to reduce the number of data exchanges. If the data falls outside the area of interest provided to the content/intermediate server 216, the element evaluator 206 can block the data and use data exchange 230 to inform the content/intermediate server 216 that the content was blocked and/or the reasons therefore. If the user determines that a site is still providing content that is not aligned with their included categories, they can inform the plug-in via the user interface (right click the ad or via plug in configuration menu) that the content provider cannot be trusted to supplement with relevant content and all content from the server will be blocked. The user can swipe with a gesture also such as swipe left to indicate content is not relevant and click on the content or swipe right if it is relevant or other such gestures.

In yet a further example, the element evaluator 206 can modify the link to express disinterest in the information that the link points to, express disinterest in one or more areas (either the same or different), express interest in one or more areas of interest and any combinations thereof in the same link. For example, the link may be modified with an &userNotInterested and a &UserInterest=<one or more areas> in the same link, and other such combinations.

Figure 3:
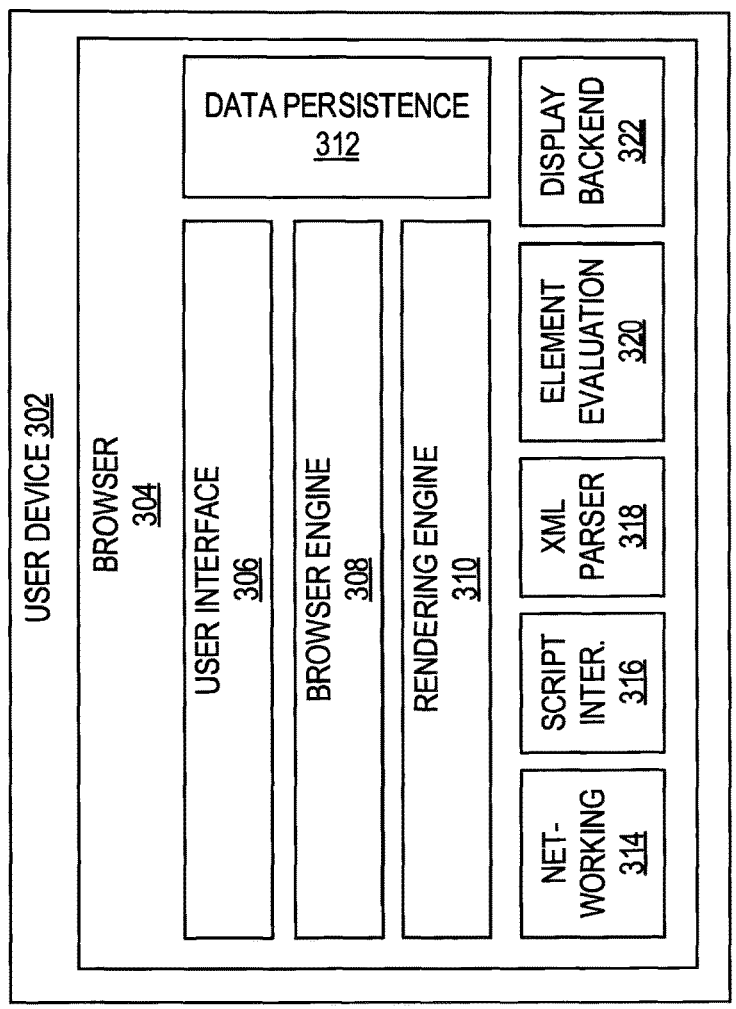
FIG. 3 illustrates another example architecture diagram of a browser plug-in that reduces bandwidth requirements.

FIG. 3 illustrates another example architecture diagram 300 of a browser plug-in 320 that reduces bandwidth requirements. A user device 302 had a browser 304 or other program, application, and so forth to display markup language documents. The architecture of the browser 304 illustrated in FIG. 3 represents a reference architecture of major subsystems that can be applied to virtually any browser architecture.

User interface 306 is the subsystem layer between the user and the browser engine 308. It provides features such as toolbars, visual page-load progress, smart download handling, preferences, printing, bookmarks, and other user interface elements and controls.

The browser engine 308 is a subsystem that provides a high level interface to the rendering engine 310. It loads a given Uniform Resource Indicator (URI) and supports basic browsing actions such as forward, back and reload. It includes hooks for viewing various aspects of the browsing session such as current page load progress, JavaScript® alerts, and so forth. It also allows the querying and manipulation of the rendering engine 310 settings.

The rendering engine 310 produces a visual representation for a given URI. In browsers, it displays HTML and Extensible Markup Language (XML) documents, applies cascading style sheets (CSS) to documents, embeds content such as images, and so forth. It also calculates page layout and may use reflow algorithms to incrementally adjust the position of elements on the page. The subsystem can also include an HTML parser, if it is not provided by a separate parser (like the XML parser 318 example). As indicated by the XML parser 318, it can also rely on plug-ins and/or separate viewers to perform the rendering of document types that are not "built in" to the functionality of the rendering engine. For example, a PDF plug-in can give the browser the ability to display portable document format (PDF) type documents.

The networking subsystem 314 includes or makes use of the network stack provided by the user device 302 to implement appropriate protocols, such as HTTP and FTP. It translates between different character sets, resolves Multipurpose Internet Mail Extension (MIME) media types for files. It can also implement a cache of recently retrieved items and resources.

The script interpreter 316 evaluates supported scripting language(s) such as JavaScript® which may be embedded in web pages.

The XML parser 318 is an example of parsers that are separate from the other subsystems. In this case, the XML parser 318 parses documents into a DOM tree.

The display backend 322 provides drawing and windowing primitives and may rely on the operating system or other subsystems of the user device 302. For example, the display backend 322 can provide a set of interface widgets, a set of fonts and so forth that are used to render the document and/or user interface 306.

The data persistence subsystem 312 stores data associated with the browsing session and other information on disk, in a local cache, and so forth. This includes high level data such as bookmarks and/or toolbar settings. It also includes lower level data such as cookies, security certificates, cached objects and so forth.

The element evaluator 320 is a plug-in in accordance with the present disclosure that provides the functionality described herein. It may utilize functionality of other subsystems, such as the rendering engine, the DOM from the XML parser, the HTML parser and so forth to accomplish its functionality. In addition, it can rely on the data persistence subsystem 312 to store the lists and so forth that are discussed herein.

Figure 4:
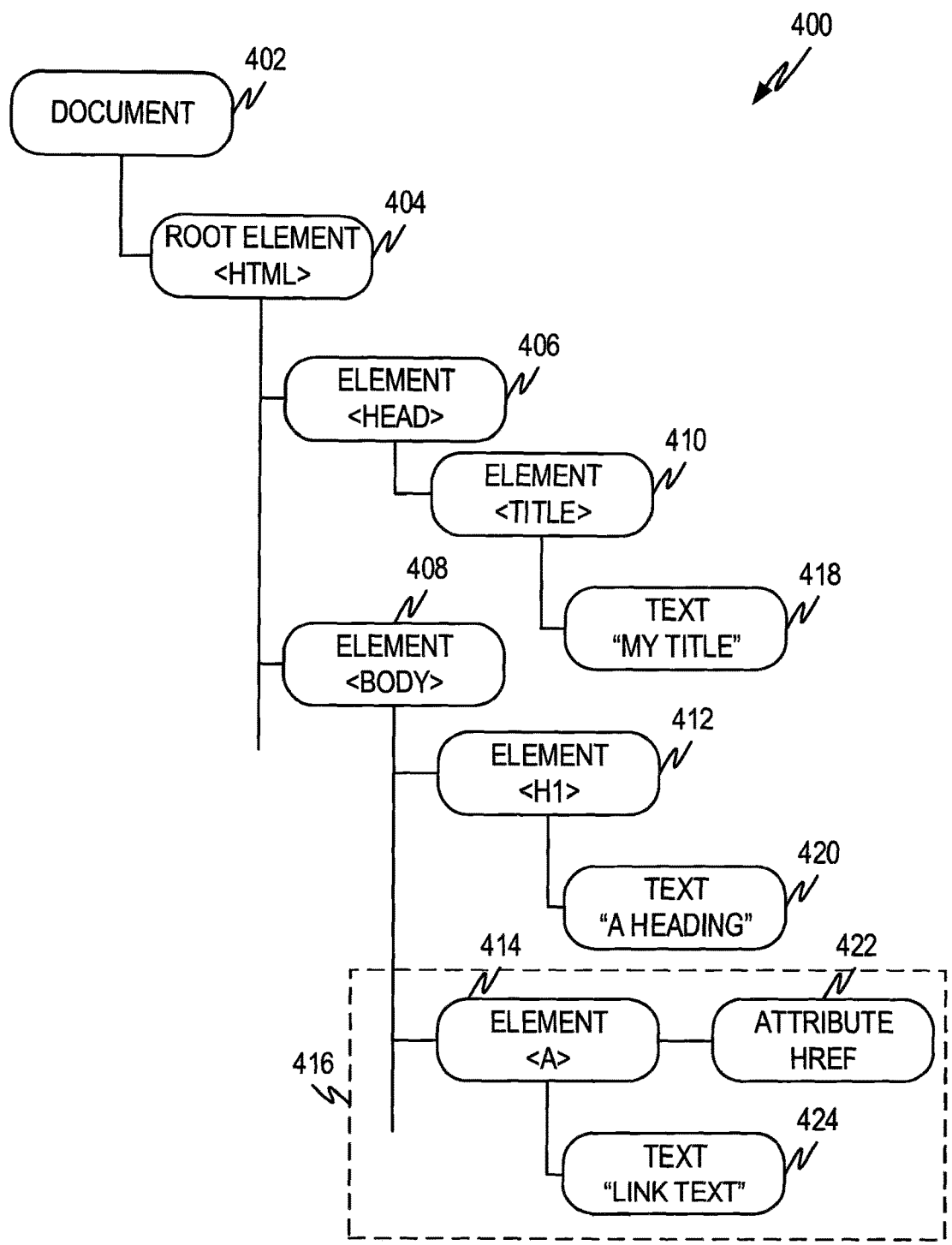
FIG. 4 illustrates a representative document object model (DOM) and a representative element for further examination.

FIG. 4 illustrates a representative document object model (DOM) 400 and a representative element 416 for further examination. Of necessity, the model 400 does not contain all the variations that are possible in a DOM. However, it will suffice for description purposes.

A DOM is a tree structure that represents the structure of the corresponding HTML. A document node 402 represents the entire document and contains a root element 404. The root element 404 comprises a plurality of sub elements such as head element 406 and body element 408. The head element 406 comprises information about the document, such as a title. Thus the title is represented by the title element 410 and the title text element 418.

The body element 408 represents the body of the document and comprises a number of elements. In the representative example, the document body comprises a level 1 heading represented by H1 element 412 along with the text element 420 that contains the text of the heading.

The body element 408 also comprises an element 416 that would trigger closer examination by the plug-in module. The element 416 comprises the anchor element 414, the href attribute element 422 and the text element 424. The anchor element 414 alerts the bandwidth saving plug-in that the element is a link that will trigger data downloaded from the URI represented by the link. The href attribute 422 contains the link (i.e., URI) itself, such as a portion of the web site's content URL or possibly the advertising URL previously described and discussed, along with all of its attributes and parameters. The text element 424 comprises a text string that is to be displayed in the rendered text. In other words, it is the active text that a user can click to activate the link.

The anchor element can comprise more, fewer or additional elements than those illustrated.

When the plug-in encounters elements that will download additional information, automatically and/or upon activation, such as element 416, the plug-in will examine the element to extract identifiers as discussed herein.

Figure 5:
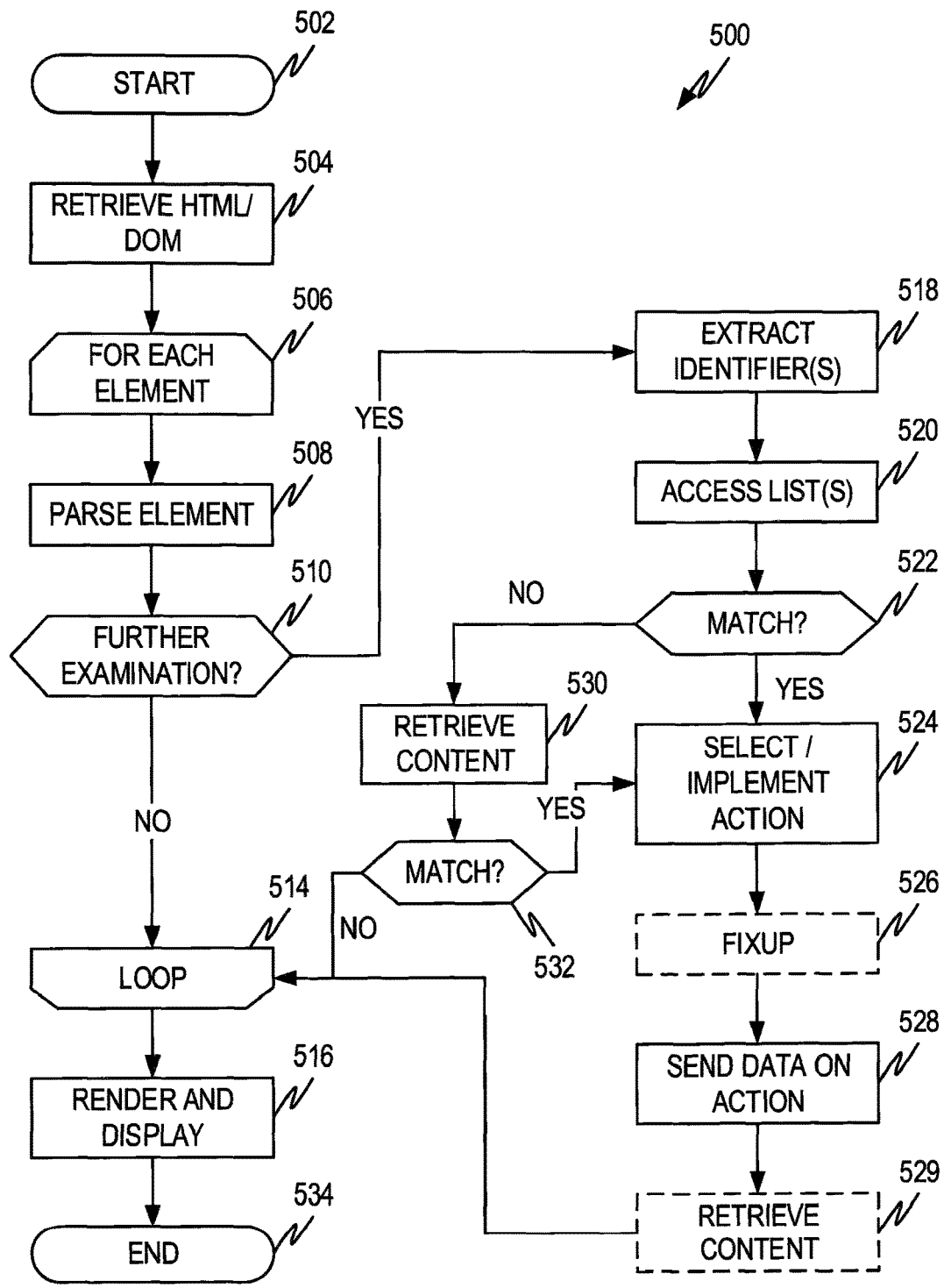
FIG. 5 illustrates an example flow diagram for operation of a browser plug-in according to embodiments of the present disclosure.

FIG. 5 illustrates an example flow diagram 500 for operation of a browser plug-in according to embodiments of the present disclosure. The flow diagram begins at operation 502 and proceeds to operation 504 where the HTML, DOM or other markup language representation is retrieved. Embodiments of the plug-in can be created that will utilize any suitable representation. The plug-in simply has to be able to identify elements of the representation that will download information, for example from a server and/or cache, that warrants further examination and be able to examine the details of the element in order to extract identifiers as discussed below.

Once a suitable representation has been identified and retrieved, operation 506 begins a loop over all the elements in the representation. Operation 508 examines the element under consideration to identify whether the element downloads information, such as from a server (i.e., a source external to the machine) or retrieve information from a cache. This operation can be performed, for example, by matching a type of element (such as by identifying an anchor tag in the element), by examining the content of the element, such as to identify a link in the element, or by looking at the functions performed by the element, such as in the case of a script. Operators and/or indicators in the element that access and/or download data represent a closed set of operators/indicators and the plug-in can look for a match in the element for known operators/indicators. This can be done, for example by pattern matching or with another known algorithm.

Operation 510 identifies whether the element warrants further examination. Elements that warrant further examination are those that download and/or access information as explained above. Other elements that can warrant further examination are elements with scripts and/or elements that may contain information (already downloaded) that relate to identifiers on the lists (i.e., like/dislike lists described above). If the element does not warrant further examination, the NO branch is followed out of operation 510, the loop is completed and no modification to the element is made as indicated by operation 514.

Although not illustrated, alternative embodiments eliminate operation 510 so that all elements have identifiers that are extracted and compared against the lists (i.e., operation 518 and 520) as explained below.

If, however, the element warrants further examination, the YES branch is followed out of operation 510 and identifiers are extracted from the element in operation 518. Extracting one or more identifiers from the element in operation 518 can be performed as described above. For example, if the element contains a link, identifiers can be extracted from the link. To repeat an example above, if the host address in the link is one registered to the National Oceanic and Atmospheric Administration (NOAA), an identifier related to weather may be extracted. Similarly, if the website is known to provide photographs taken by the Hubble Telescope, an identifier related to astronomy may be identified. Other times, identifiers can be drawn from the various parameters associated with a link, such as the various ad link parameters identified above or that occur in the link. In yet another example, identifiers can be drawn from the element itself, metadata associated with the element, and so forth as previously described.

Operation 520 accesses one or more lists that comprise areas of interest and/or disinterest as identified above and the identifier(s) extracted in operation 518 are compared to the identifiers in the one or more lists to identify whether a match exists (operation 522).

If a match exists, the YES branch is followed from operation 522 to operation 524. Operation 524 selects and implements one or more actions. The possible actions include, but are not limited to, removing content (i.e., removing content from an element so that it is not displayed), deleting the element, relocating the content and/or rearranging the element so that it is rendered in a different location in the document (i.e., web page), indicate interest and/or disinterest in a particular area, and/or combinations thereof. The details of these actions are discussed in greater detail below.

Operation 526 represents any fixup that occurs as a result of the actions. For example, if content is removed and/or an element is removed, the DOM, HTML and/or other representation may need fixup so that no error occurs as the web page is rendered. Such fixup can comprise injecting HTML and/or other code into the web page in order to replace the removed element. Fixup can also comprise simply adjusting HTML and/or other code that is there.

Operation 528 sends information to the server (i.e., where the data is downloaded and/or will be downloaded from). This information can comprise an indication of the action taken and/or reasons why the action was taken as explained elsewhere.

Operation 529 retrieves the content specified by the link, with any modifications made by operation 524 as explained below, if the content has not already been retrieved and the action results in retrieval of content. The dashed box indicates that content is not always retrieved as explained elsewhere.

Returning to operation 522, if a match is not detected, it can be for one of at least two reasons. A match may not be found in operation 522 because the plug-in was unable to extract sufficiently informative identifiers from the element under examination. For example, the plug-in may have been unable to determine an identifier at all from the element. Another reason for the lack of a match is simply that the content is fine and the identifier, even if sufficiently informative, does not exist in the list. The NO branch out of operation 522 will distinguish between these two cases.

When the NO branch out of operation 522 is followed, execution proceeds to operation 530 where the content is retrieved and one or more identifiers are extracted from the downloaded content, the metadata associated with the content, or other information available after the content was downloaded as explained above.

Operation 532 determines whether there is a match between the identifiers extracted in operation 530 and the one or more lists of operation 520. If no match exists, this means that the identifiers do not exist in the lists and the content should be rendered without modification by the plug-in or additional actions taken. Thus the NO branch is followed out of operation 532 and the loop for that element is finished (operation 514).

If a match occurs in operation 532, the YES branch is followed and execution proceeds to operation 524 and subsequent operations as described above.

Although not explicitly indicated, the operations of 530 and 532 can be repeatedly performed if the downloaded content is a redirect and/or new link and identifiers extracted from the redirect and/or new link are insufficient to tell whether a match occurs. In other words, 530 and 532 can be performed until the "end of the line" is reached at which point if no match occurs, execution returns to operation 514.

Once all elements have been examined in the loop, execution proceeds to operation 516 where the web page is rendered and displayed. The method ends at operation 534.

Figure 6:
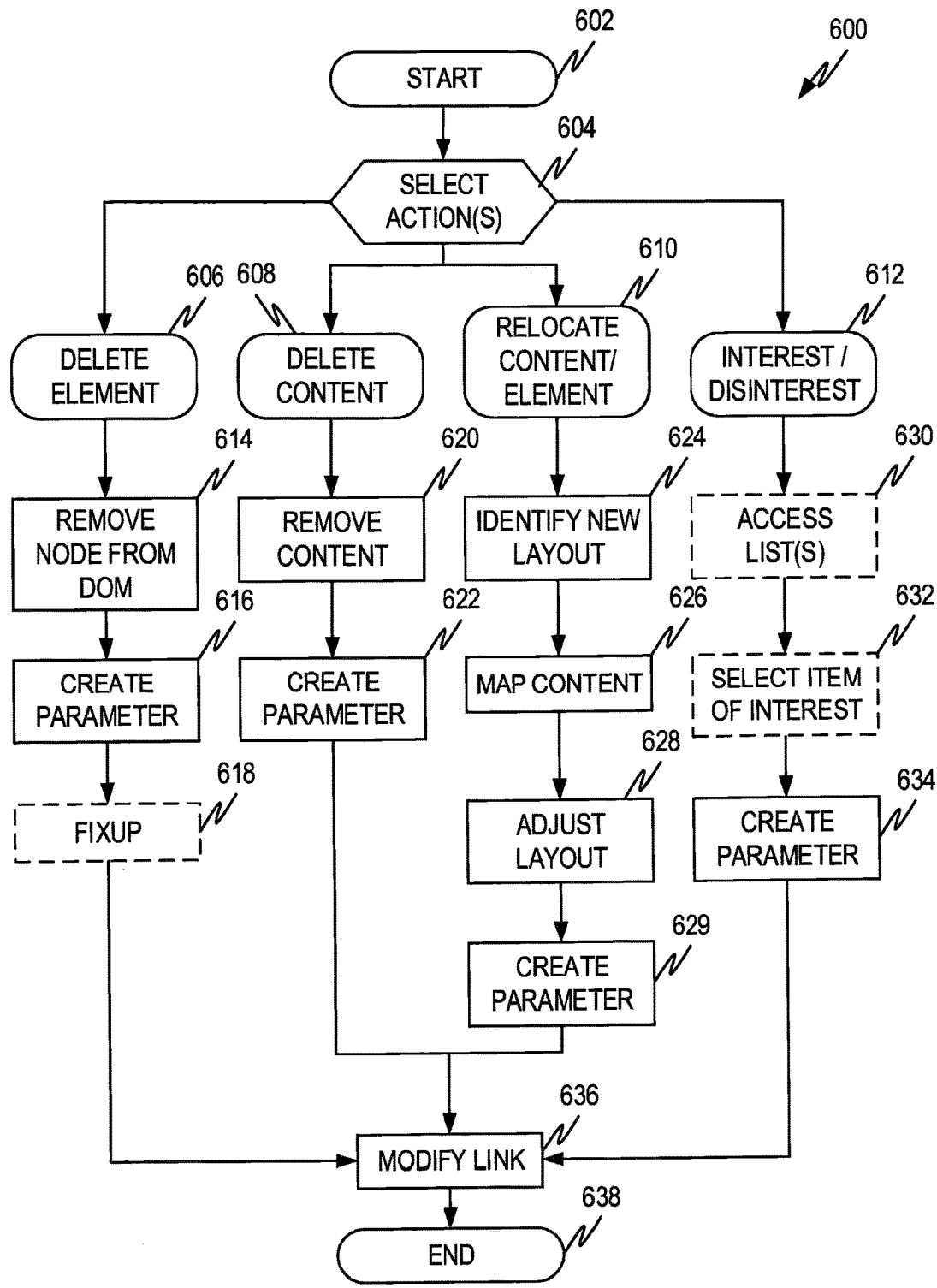

FIG. 6 illustrates an example flow diagram 600 for selecting actions according to operation of a browser plug-in. In other words, the flow diagram 600 represents an example implementation of operation 524 of FIG. 5.

Execution starts at operation 602 and proceeds to operation 604 where one or more actions are selected. In this example embodiment, the possible actions are to delete the element (i.e. operations under identifier 606), remove content associated with the element (i.e., operations under identifier 608), relocate content and/or the element (i.e., operations under identifier 610) and/or expressing interest and/or disinterest to the data source (i.e., operations under identifier 612). Which operation and/or combination of operations that are taken will be dependent on the embodiment as well as whether the user expresses interest and/or disinterest in an area.

In a first series of examples, if the matching (i.e., as a result of the operations in FIG. 5) between an extracted identifier and an identifier on one or more lists indicates the user is disinterested in the data, one embodiment of the plug-in will delete the element and then express disinterest to the data source. In another embodiment, the content will be blocked and disinterest expressed. In yet another embodiment, the content will be relocated and disinterest expressed. In still a further embodiment the element itself will be relocated and disinterest expressed. In still further embodiments, the element will be deleted, the content will be deleted, the content relocated, or the element relocated without being combined with an expression of disinterest. In still a further example, the plug-in sends back an expression of disinterest, without being combined with other actions of FIG. 6. In yet a further example, the system sends back an area that is of interest, either alone or in combination with one or more of deleting the element, deleting the content of the element, relocating the content and/or relocating the element.

In yet another series of examples, if the if the matching (i.e., as a result of the operations in FIG. 5) between an extracted identifier and an identifier on one or more lists indicates the user is interested in the data, the content is relocated. In yet another example, the element is relocated. In still a further example, the system sends an expression of interest. In still further examples, the actions of relocating content and/or relocating the element are combined with an area of interest to the user.

Once operation 604 selects the action and/or combination of actions to be implemented, execution proceeds to the appropriate action. If multiple actions are to be performed, the operations under each action are performed. For example, if the identified actions are to delete the content and send an expression of disinterest, operations 620, 622 and then operation 634 will be performed. Execution then proceeds to operation 636.

The individual actions are explained in conjunction with the appropriate identifiers (i.e., identifier 606, 608, 610 and 612).

If the element is to be removed, execution proceeds to operation 614 where the node is removed from the DOM, the HTML code and/or other representation. A parameter is created to indicate that the content was blocked and/or removed. Such a parameter can be appended to the link, as previously described. Thus, if the parameter used to indicate content is blocked is "&ContentBlocked," the parameter can be appended to the link that would otherwise be used to retrieve the data.

Operation 618 represents any needed fixup after removal of the element in order to prevent errors in the rendering process. This can be accomplished as explained above in conjunction with operation 526.

If the content for the element is to be removed, execution proceeds to 620 where the content is deleted/removed. Operation 622 creates a parameter to indicate that the content was removed. A parameter such as "&ContentRemoved" can be used for such a purpose.

The distinction between element removal (i.e., 606) and content removal (i.e., 608) is that in the first, the entire element is removed while in the latter, only the content is removed. The first may be appropriate, for example, when the content has not been downloaded while the second may be appropriate when the content has already been downloaded, although either can be used independent of whether the content has been downloaded or not. A variation of content removal (i.e., 608) if the content has not been downloaded yet is to simply refrain from downloading the content. Thus, how content removal is implemented may depend on whether the content has been downloaded or not.

Another distinction between element removal and content removal is seen in their effect on the rendered web page. If a frame or other location on the web page is associated with the element such that content rendered from the element fills that frame, then in the first (element removal) the frame may not exist at all. In the second, the frame will still exist, but will simply be devoid of content.

If the content and/or element is to be relocated, execution proceeds to operation 624 where a new layout is identified. A new layout can be identified, for example by moving content from one location to another and/or swapping content locations (for example as explained in conjunction with FIG. 10), be defined by a new style sheet and/or combination of style sheets and so forth. Operation 624 identifies a location where the content will be moved to and content to replace the moved content (if any) if content is to be moved. If the element is to be moved, operation 624 identifies a new location for the element. In this context, moving content may be easier (i.e., require fewer computational cycles) than moving the entire element.

When content and/or the element is moved, one way to identify potential move locations is to identify other elements/locations in the web page where similar content resides and/or similar sized content resides. Thus, if two types of content are of the same or similar types, then they can be swapped or the content of one moved to replace the content of the other. Similarly, content that are of the same and/or similar sizes can be swapped and/or the content of one can replace the other. Additionally, or alternatively, content can be resized as part of the relocation.

Operation 626 maps the content to the new layout in accordance with the decisions made by operation 624. Thus, if two items of content are to be swapped, operation 626 maps the content to the respective locations. This mapping can be accomplished by swapping parameters, or other information, swapping elements, or in another fashion. Operation 628 adjusts the layout as needed and makes the changes in the DOM, HTML, style sheets, and/or other representation.

Operation 629 creates a parameter to indicate to the data source that the content was relocated. A parameter such as "&ContentRelocated" and/or additional parameters that identifies how the content was relocated (i.e., deemphasized, emphasized, etc.) can be added as well.

If interest is to be expressed, execution proceeds to operation 630. Operation 630 access one or more lists comprising areas of interest and operation 632 selects an area of interest. Areas of interest may be selected based on context or in a random fashion or in some other manner. For example, when an area of interest is selected based on context, if a user is doing research on a particular topic and/or the recent browsing history indicates that the user has been viewing websites that relate to a particular area, the selected area of interest can encompass or relate to that area. As a more specific example, if the recent browser history indicates a user has been viewing web pages that relate to different car models and/or web pages from a car magazine, the selected area of interest can be related to cars. As an example, if the list does not contain the identifier "cars" but does contain the identifier of a particular Sport Utility Vehicle (SUV) as an area of interest, the identifier of the particular SUV can be selected as the area of interest. To identify a match between browsing history and the list, identifiers can be extracted from the browsing history and compared to the identifiers in a manner previously described. In the case of multiple matches (i.e., the list contains a particular SUV model and a particular type of car manufacturer), both can be sent, or one can be selected based on closeness to the data used to identify the context, "newness" and or "staleness" of the identifier in the list, in a random fashion, and/or so forth.

Operation 634 creates an parameter that contains the area of interest, such as &AreaofInterest="dogs" or some other parameter.

If disinterest is to be expressed, an identifier has already been identified through some other fashion, i.e., by operations that extracted the identifier from the link and/or content and has already been matched to one or more identifiers in one or more lists. Thus, there is no need to perform operations similar to operation 630 and/or 632. Thus the only operation that need be performed is operation 634. The parameter expressing interest can be a simple "&NotInterested" parameter as previously discussed or can expressly call out the area of disinterest such as "&AreaofDisinterest="AppleLaptop"".

Once the various parameter(s) have been created that will be provided to the data source (i.e., server, etc.) to indicate the action taken and/or reasons therefore, operation 636 modifies the link to include the parameters. As a representative example, if the system is expressing interest in a particular area, and the link is an ad link as previously discussed, the link may be modified with the &AreaofInterest="dogs" to achieve something like:

http://big.adprovider.net/ADJ/publisher/zone;topic=abc;
  sbtpc=def;cat=ghi;kw=xyz;tile=1;slot=728×90.1;
  sz=728×90;
  ord=7268140825331981?&AreaofInterest="dogs"

Execution ends (i.e., returns to FIG. 5) in operation 638.

Figure 7:
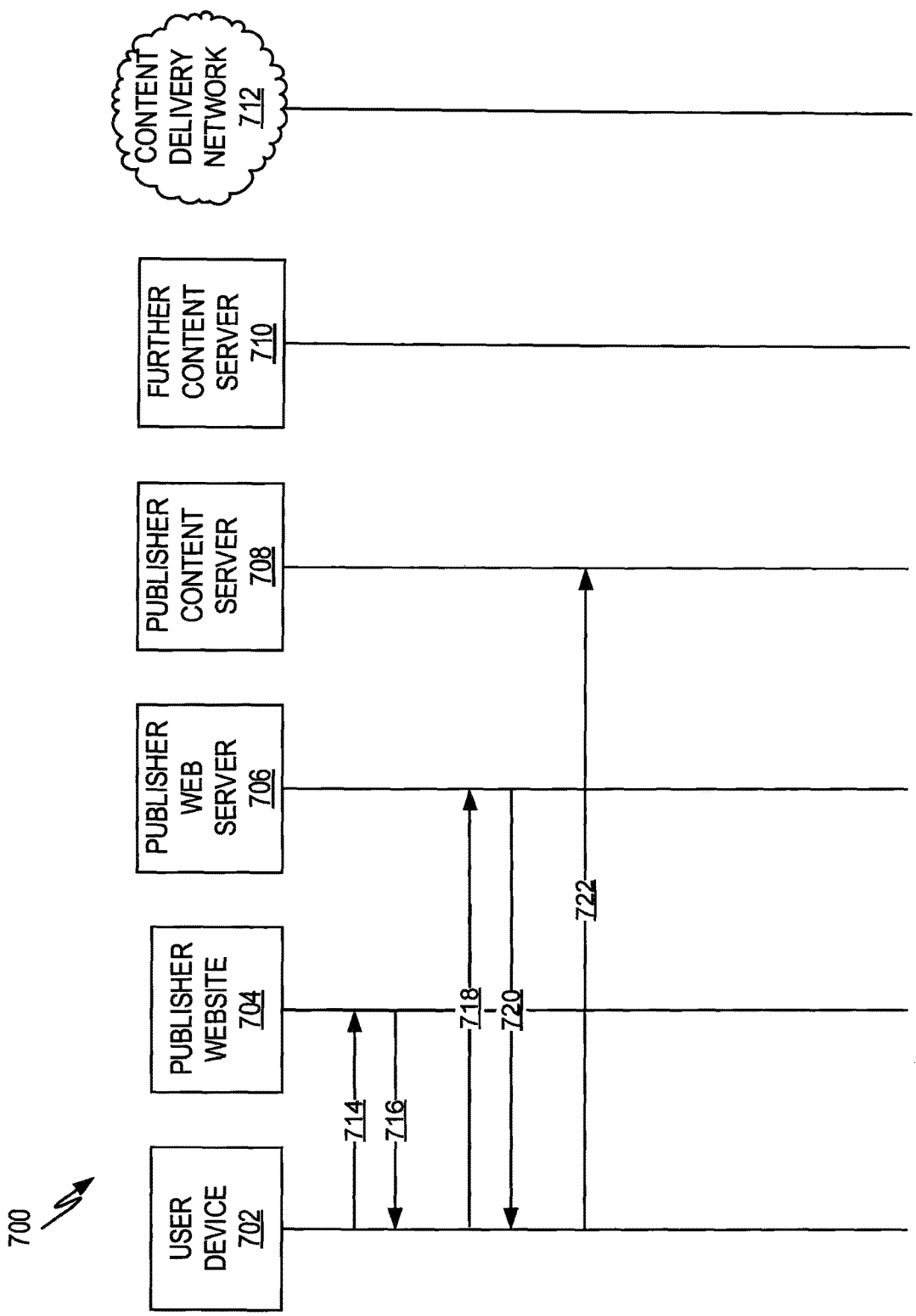
FIG. 7 illustrates an example set of data exchanges of a browser plug-in according to embodiments of the present disclosure.
Figure 8:
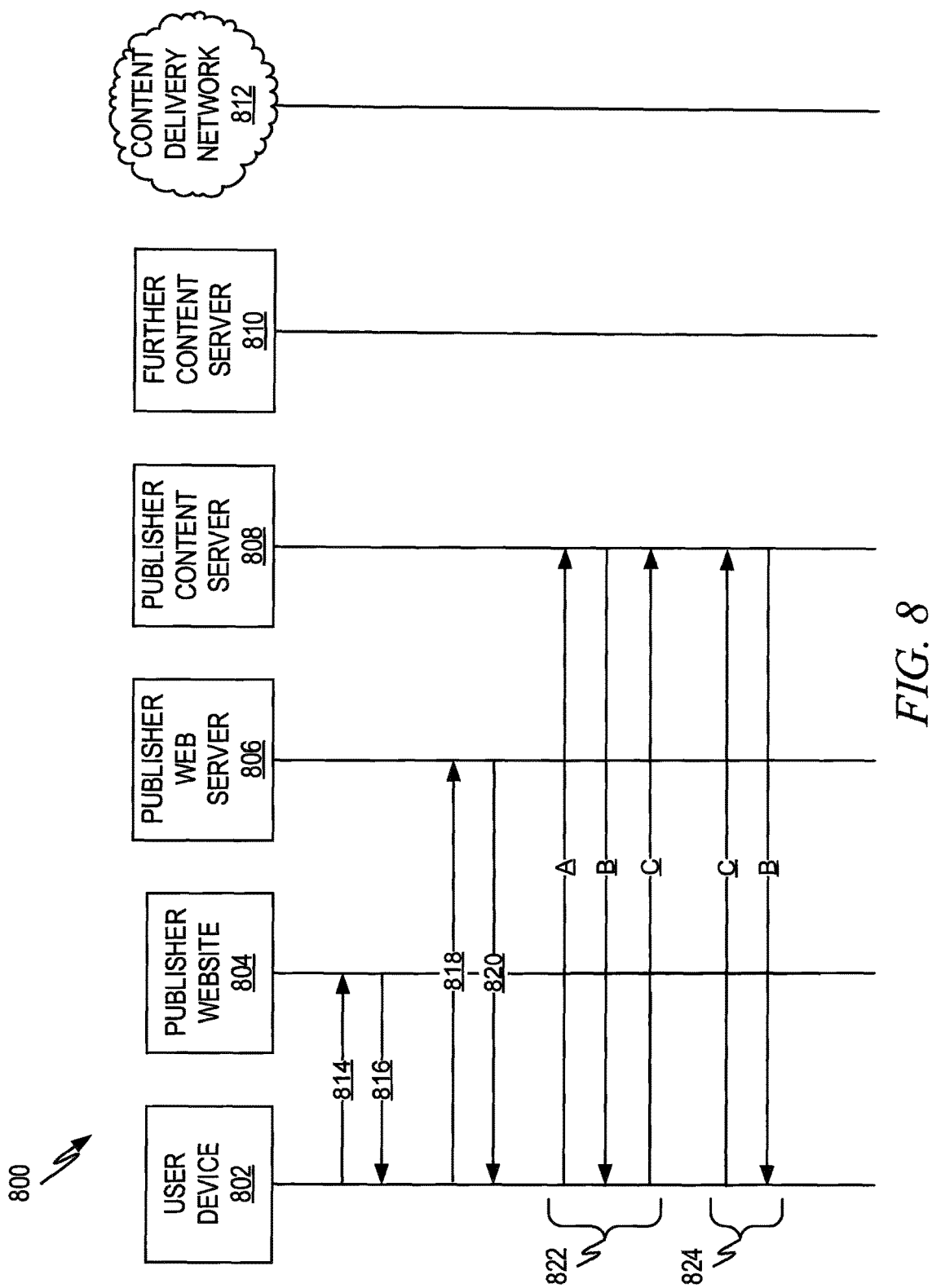
FIG. 8 illustrates another example set of data exchanges of a browser plug-in according to embodiments of the present disclosure.
Figure 9:
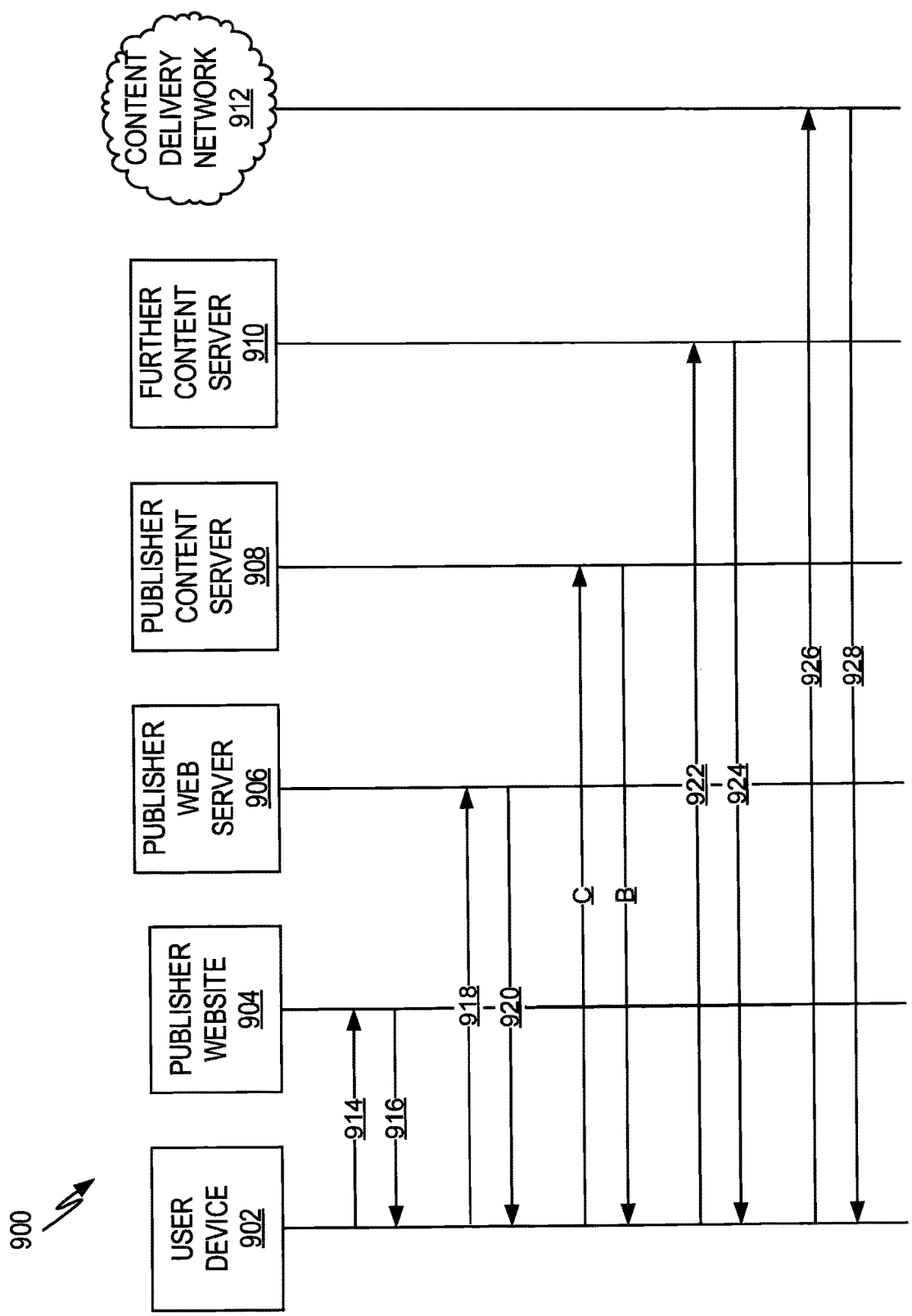
FIG. 9 illustrates another example set of data exchanges of a browser plug-in according to embodiments of the present disclosure.

FIGS. 7-9 illustrate example set of data exchanges that can reduce the data downloaded and/or increase the relevance of the data downloaded, for example when interest and/or disinterest is expressed. FIG. 7 illustrates an example set of data exchanges 700 of a browser plug-in according to embodiments of the present disclosure where numerous data exchanges are eliminated, thus conserving time, bandwidth and/or computing resources.

A user, using a browser on a user device 702 navigates to a publisher website 704 as indicated by data exchange 714. The publisher website 704 sends back a markup language document, such as an HTML web page as indicated by data exchange 716. The HTML code in the web page tells the browser how to get content, from the publisher web server 706 and how to format it. The browser initiates data exchange 718 requesting the data from the publisher web server 706 and receives the content in return in data exchange 720.

At this point, the browser on the user device 702 has the web page and the plug-in is able to identify elements within the HTML, DOM and/or other representation that retrieve additional data from other locations, such as publisher content server 708. The link can be parsed and identifiers extracted as explained in conjunction with FIG. 5 above.

One option, in accordance with FIGS. 5-6 discussed above is that before the content is downloaded, the plug-in is able to identify that the content is not of interest to the user. In accordance with operations 614, 616, 618 and/or operations 620 and 622, the content can be blocked and not downloaded. The parameter created by operation 618 or 622 (as the case may be) can be returned to the publisher content server 708 to indicate to the publisher content server 708 that the content has been blocked/will not be downloaded and/or the reason therefore. This is represented by data exchange 722. Because the content was not downloaded, any additional exchanges that would have otherwise happened in the absence of the blocked content will simply not occur, thus saving time, bandwidth and/or computer resources.

Additionally, or alternatively, in conjunction with operations 630, 632 and/or 634, the plug-in can create a parameter that expresses interest in a particular area and/or disinterest in a particular area. Thus, one or more identifiers may be extracted from a link and the system identifies that the user is not interested in the area(s) associated with the identifier(s). In response, the plug-in can send in data exchange 722 an indicator of the area not of interest and/or an area that the user would be interested in. In either case, the data is not downloaded and the exchanges are avoided as previously described. The server may for example send a smaller payload of content because it eliminates content that the user is not interested in. The smaller the amount of content downloaded from the server reduces storage consumed and wear on the local device to cache the content from the web in its filesystem as well as reduces the amount of power consumed to downloading and render the reduced amount of content.

FIG. 8 illustrates another example set of data exchanges 800 of a browser plug-in according to embodiments of the present disclosure that avoids data exchanges that may have otherwise occurred, thus conserving time, bandwidth and/or computing resources.

The preliminary exchanges, 814, 816, 818 and 820 operate as described in conjunction with FIG. 7 data exchanges 714, 716, 718 and 720 and the details need not be repeated here.

After data exchange 820, the browser on the user device 802 has the web page and the plug-in is able to identify elements within the HTML, DOM and/or other representation that retrieve additional data from other locations, such as publisher content server 808. The link can be parsed and identifiers extracted as explained in conjunction with FIG. 5 above.

FIG. 8 illustrates two different options of data exchanges that can occur, based on the embodiment. These different sets of exchanges are represented in FIG. 8 by data exchange set 822 (data exchanges A, B and C) and data exchange set 824 (data exchanges C and B). These occur in the alternative for any given link. Embodiments may use one set for one link and a different set for a different link or may use the same set for all links.

In the first set of data exchanges 822, the plug-in cannot determine from identifiers extracted from the link (i.e., operations 518, 520, 522) whether to download the content and render it as specified in the web page or whether to take some other action. In this situation, the content is downloaded by sending data exchange A, which is a request using the link of the element and receiving, in return the content (or a redirect, etc. as previously explained) in data exchange B.

In FIG. 5, execution would proceed to operation 530 where content is retrieved and identifiers extracted and, in this example, matched to one or more identifiers in the list. The plug-in may then respond to the publisher content server 808 with an indication that the content has been blocked, that the content has been removed, that the content is of no interest and/or that other content would be of interest as previously explained in conjunction with FIG. 6. This is indicated by data exchange C of data exchange group 822. This data exchange C informs the publisher content server 808 that further exchanges to download content associated with this link will not be performed and/or the reasons therefore as previously described.

In the alternative, if the identifiers in possession of the plug-in are sufficient to identify that the user is not interested, the set of exchanges 824 can be utilized instead. In this case, data exchange C can inform the publisher content server 808 that the content will be blocked, removed, be relocated, and/or is uninteresting to the user. In response, the publisher content server 808 can respond (i.e., data exchange B) with content that is different from that specified by the link as downloaded to the browser (i.e., in data exchange 820). The plug-in can then determine whether the downloaded content is of interest and, if not, delete, block, relocate, and so forth as described in FIG. 6. It should also be appreciated a determination can be made where a smaller amount of content is downloaded in 824 based on the plug in informing the server of the user's inclusion and exclusion topic information.

Additionally, or alternatively, if data exchange C contains an expression of interest, the area of interest may help the publisher content server 808 provide suitable content as part of data exchange B.

FIG. 9 illustrates another example set of data exchanges 900 of a browser plug-in according to embodiments of the present disclosure that avoids downloading irrelevant data.

The preliminary exchanges, 914, 916, 918 and 920 operate as described in conjunction with FIG. 7 data exchanges 714, 716, 718 and 720 and the details need not be repeated here.

After data exchange 920, the browser on the user device 902 has the web page and the plug-in is able to identify elements within the HTML, DOM and/or other representation that retrieve additional data from other locations, such as publisher content server 908. The link can be parsed and identifiers extracted as explained in conjunction with FIG. 5 above.

In this representative example, data exchange set 824 (described above) is used as indicated by data exchange C and data exchange B. If the plug-in can determine that the data is of interest (i.e., a redirect, new link, etc. received in data exchange B), the plug-in can allow the browser to follow the various redirects to their ultimate conclusion as indicated by data exchanges 922/924 and data exchanges 926/928. If, however, the plug-in detects anywhere along the way that the data is not interesting (i.e., identifiers extracted from returned data match one or more identifiers on a list that contains identifiers that will be blocked, relocated, etc.), the plug-in can terminate the subsequent download and/or take any action as described in FIG. 6.

Figure 10:
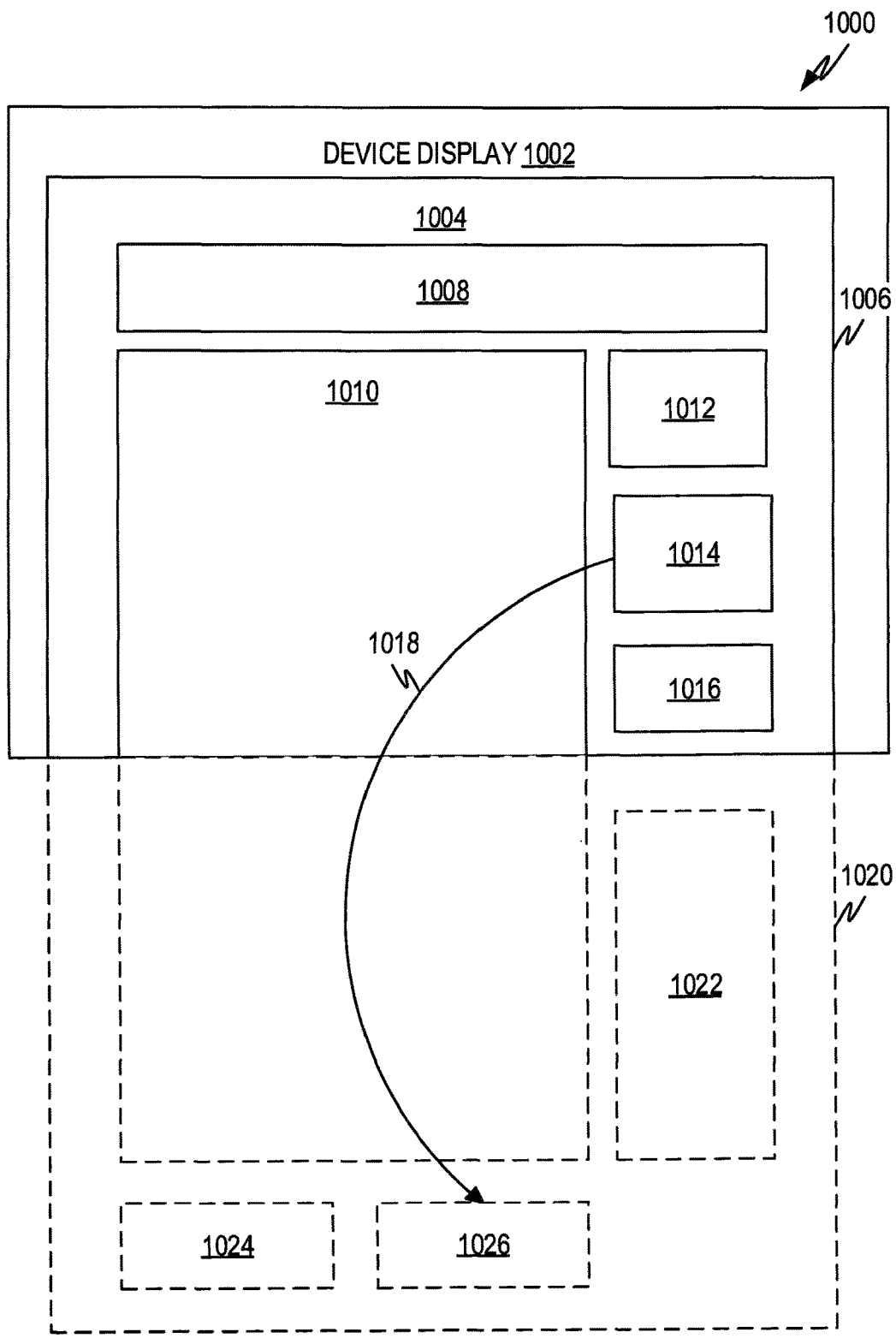
FIG. 10 illustrates rearranging layout of a web page according to embodiments of the present disclosure.

FIG. 10 illustrates rearranging layout of a web page 1000 according to embodiments of the present disclosure. This illustration represents the various options that can occur, for example, in operations 624, 626, 628 and 629 above. The illustration comprises device display 1002 which has a viewing area that can display a portion of a web page 1004. The portion of the web page 1004 that can be displayed is illustrated by 1006 and the portion of the web page that is "below the fold" (i.e., off screen for an initial presentation of the web page 1004) is illustrated by 1020. The web page 1004 comprises various frames or locations where content will reside. Thus, one location 1008 may represent a location where a title or heading will be placed, another location 1010 may represent a main content location where the main content of the web page will be displayed and other locations 1012, 1014, 1016, 1022, 1024 and 1026 represent other locations where content can reside such as weather, ads, sports scores, navigation aids, term heat list, and the myriad of other types of content that typically accompany a web page reside.

In accordance with operation 624 content has been identified that will be relocated. In the representative example, the content would otherwise reside in location 1014. In accordance with operation 624, additional candidate locations may be identified as 1016, 1024 and 1026. These candidate locations can be identified by the size, by the data type that would otherwise be placed there, or by some other mechanism as previously described. It should be appreciated the subject invention also includes a web page that loads additional content when the user scrolls to the bottom of the page, the dynamic content retrieved can be customized to the users interests instead of a default content management system layout by taking into account the feedback mechanism with inclusion and exclusion parameters (topics) appended to URLs provided by the content management system. The user's preferences can cause articles to appear in an order that is most likely to be relevant to the user as well as excluding loading In this example, location 1026 is selected as a target (i.e., destination) location, based on the fact that both location 1014 and 1026 are slated to contain the same type of content (i.e., ads, ancillary content such as sports scores, headline news, weather and so forth). In this particular example, operation 624 identifies that the content of location 1014 should be moved and the content in location 1026 overwritten (i.e., not downloaded and/or displayed).

Operation 626 completes the mapping as indicated by arrow 1018, such as by substituting the link associated with location 1014 for the link associated with location 1026, associating downloaded content slated to go into location 1014 with location 1026, and/or some other fashion. Location 1014 can be deleted (i.e., by deleting the element such as by operations 614, 616 and/or 618) and/or left blank.

The net effect is that content that would otherwise be above the fold is relocated to a location below the fold, in order to deemphasize the importance of the data and/or move it to a location that might be more acceptable to the user.

In other examples, the data could be swapped (i.e., data in location 1026 moved to location 1014), data below the fold could be relocated above the fold (i.e., to give it more emphasis) and or other similar data relocations.

Example Machine Architecture and Machine-Readable Medium

Figure 11:
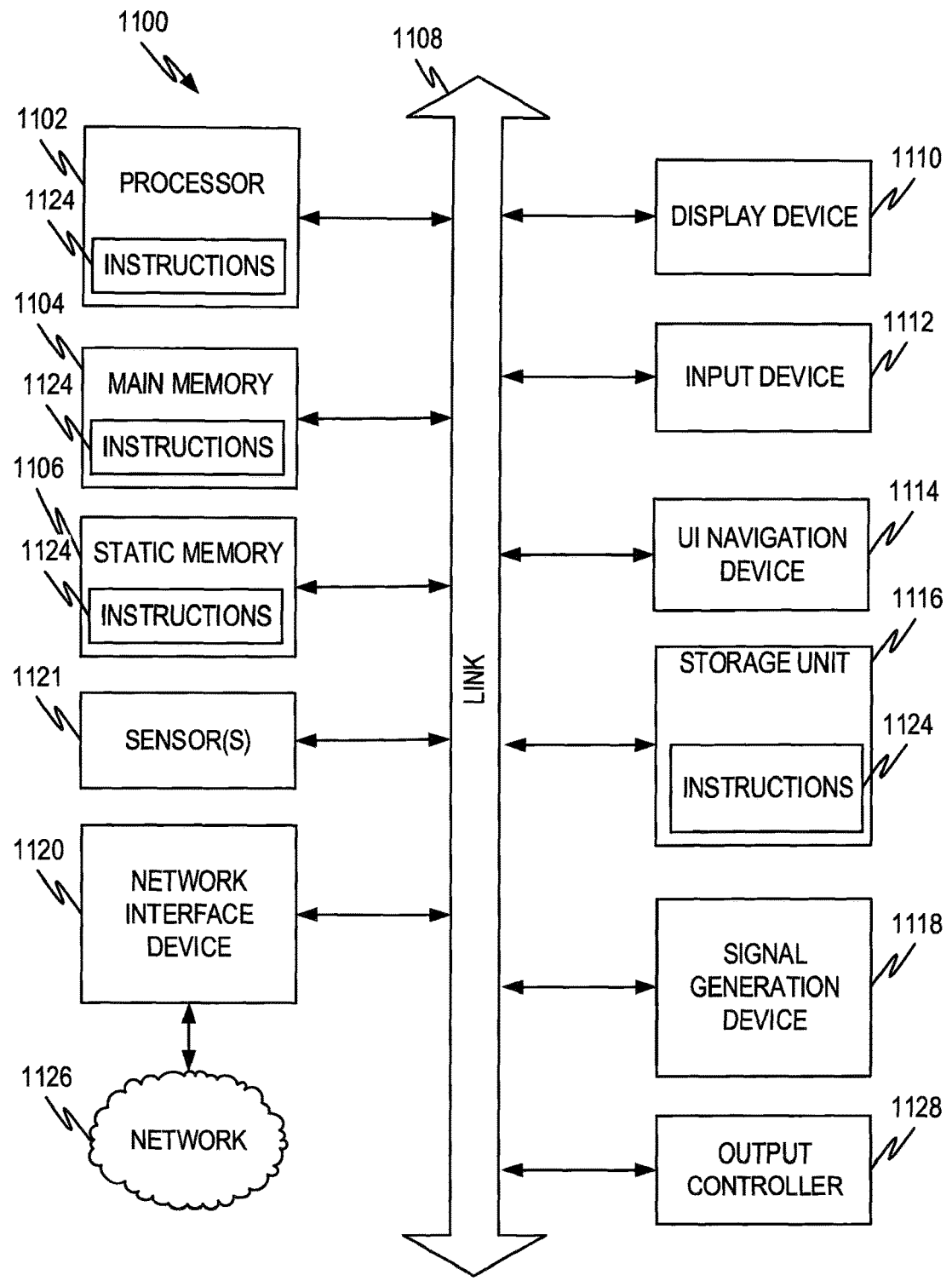
FIG. 11 illustrates a representative machine architecture suitable for implementing the systems and so forth or for executing the methods disclosed herein.

FIG. 11 illustrates a representative machine architecture suitable for implementing the systems and so forth or for executing the methods disclosed herein. The machine of FIG. 11 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 11 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 1100 includes at least one processor 1102 (e.g., a central processing unit (CPU), a graphics processing unit (GPU), advanced processing unit (APU), or combinations thereof), one or more memories such as a main memory 1104, a static memory 1106, or other types of memory, which communicate with each other via link 1108. Link 1108 may be a bus or other type of connection channel. The machine 1100 may include further optional aspects such as a graphics display unit 1110 comprising any type of display. The machine 1100 may also include other optional aspects such as an alphanumeric input device 1112 (e.g., a keyboard, touch screen, and so forth), a user interface (UI) navigation device 1114 (e.g., a mouse, trackball, touch device, and so forth), a storage unit 1116 (e.g., disk drive or other storage device(s)), a signal generation device 1118 (e.g., a speaker), sensor(s) 1121 (e.g., global positioning sensor, accelerometer(s), microphone(s), camera(s), and so forth), output controller 1128 (e.g., wired or wireless connection to connect and/or communicate with one or more other devices such as a universal serial bus (USB), near field communication (NFC), infrared (IR), serial/parallel bus, etc.), and a network interface device 1120 (e.g., wired and/or wireless) to connect to and/or communicate over one or more networks 1126.

Executable Instructions and Machine-Readable Medium

The various memories (i.e., 1104, 1106, and/or memory of the processor(s) 1102) and/or storage unit 1116 may store one or more sets of instructions and data structures (e.g., software) 1124 embodying or utilized by any one or more of the methodologies or functions described herein. These instructions, when executed by processor(s) 1102 cause various operations to implement the disclosed embodiments.

As used herein, the terms "machine-readable medium," "computer-readable medium" and "device-readable medium" mean the same thing and may be used interchangeably in this disclosure. The terms include a single medium or multiple media (e.g., a centralized or distributed database, and/or associated caches and servers) that store the one or more instructions or data structures. The terms shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The terms shall accordingly be taken to include, but not be limited to, solid-state memories, and optical and magnetic media. Specific examples of machine-readable media, computer-readable media and/or device-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. The terms machine-readable media, computer-readable media, and device-readable media specifically exclude non-statutory signals per se, which are covered under the term "signal medium" discussed below.

Signal Medium

The term "signal medium" shall be taken to include any form of modulated data signal and signals per se. The term "modulated data signal" means a signal that has one or more of its characteristics set or changed in such a matter as to encode information in the signal.

EXAMPLE EMBODIMENTS

Example 1

A method for reducing one or more of bandwidth, time, computing resources and power in a machine operating a browser, comprising:

receiving a markup language document from a network (220, 224, 400, 716, 720, 816, 820, 916, 920), the markup language document comprising a plurality of elements (402-424);

extracting, from an element (416) of the plurality of elements, at least one identifier (518);

comparing the at least one identifier (522, 532) to at least one list of identifiers (520) stored locally on the machine to identify whether a match exists between the identifier and at least one identifier on the at least one list of identifiers;

responsive to a match being identified, selecting at least one action to be performed based on the match (524), the action comprising at least one of removal of the element (606), relocation of the content associated with the element (608), relocation of the content associated with the element (610 and indicating an area of interest, an area of disinterest or both (612);

initiating implementation of the action and presenting results of the action using at least one user interface to a user (516); and sending at least an indication of the action to a system on the network (528).

Example 2

The method of example 1, wherein the at least one list is configured by the user, retrieved from an online storage location, obtained from a social networking profile of the user, or any combination thereof.

Example 3

The method of example 1 wherein the at least one action comprises removal of the element and the method further comprises:

modifying a document object model (DOM) derived from the document to remove the element from the DOM;

fixing remaining elements of the DOM to account for removal of the element; and wherein the indication informs the system on the network that the element was removed.

Example 4

The method of example 1, wherein the at least one action comprises relocation of content associated with the element and the method further comprises:

identifying a new location for the content;

modifying one or more elements from a DOM to place the content at the new location; and wherein the indication informs the system on the network that the content was relocated.

Example 5

The method of example 1 wherein the at least one list of identifiers comprises an indication of priority associated with each identifier in the at least one list of identifiers.

Example 6

The method of example 1, wherein the at least one action comprises indicating interest, disinterest, or both and the method further comprises:

selecting at least one of an area of interest and an area of disinterest; and wherein the indication comprises the area of interest, the area of disinterest or both.

Example 7

The method of example 6, wherein the element comprises a link that retrieves additional data from at least one system connected to the network and the method further comprises:

modifying the link from its original form by appending the area of interest, the area of disinterest or both, the indication comprising at least a portion of the modified link;

receiving from the system on the network, content selected in accordance with the area of interest, the area of disinterest or both.

Example 8

The method of example 1, wherein the at least one action comprises removing content associated with the element but otherwise leaving the element intact.

Example 9

The method of example 1, 2, 3, 4, 5, 6, 7, or 8, wherein the element comprises a link that retrieves additional data from at least one system connected to the network and the method further comprises:
modifying the link from its original form by appending the area of interest, the area of disinterest or both, the indication comprising at least a portion of the modified link.

Example 10

A computing system comprising:
a processor and executable instructions accessible on a machine-readable medium that, when executed, cause the system to perform operations comprising:
receive a markup language document from a network (220, 224, 400, 716, 720, 816, 820, 916, 920), the markup language document comprising an element (416) that retrieves additional data from at least one system connected to the network;
extract from the element (416) a link (422) to the additional data and an identifier (518) associated with the additional data;
compare the identifier (522, 532) against a list of identifiers (522) stored locally on the system to identify whether a match exists between the identifier and an identifier on the list of identifiers;
responsive to a match being identified, select at least one action to be performed based on the match (524);
modify the link from its original form (636), the modification indicating the at least one action; and
send at least a portion of the modified link (528) to a server identified in the link to inform the server of the at least one action.

Example 11

The system of example 10, wherein the at least one action comprises at least one of removal of the element, removal of content associated with the element, relocation of content associated with the element, and indicating interest or disinterest.

Example 12

The system of example 10, wherein the operations further comprise:
receive, in response to sending the at least a portion of the modified link, content selected by the server based on the at least a portion of the modified link.

Example 13

The system of example 10, wherein:
prior to sending the at least a portion of the modified link, the operations further comprise:
receive, from the server, content associated with the element; and
wherein the at least a portion indicates that the received content has been blocked or moved.

Example 14

The system of example 10, 11, 12, or 13, wherein the list of identifiers comprises purchase history for a user and wherein the at least a portion indicates at least one item in the purchase history.

Example 15

The system of example 10, 11, 12, or 13, wherein the identifier associated with the additional data comprises a content type and wherein the list of identifiers comprises a list of content types to be blocked and wherein the at least a portion indicates a content type that matches the identifier associated with the content type.

Example 16

The system of example 10, 11, 12, or 13, wherein the at least one action comprises removing content associated with the element but leaving the element intact.

Example 17

A machine-readable medium having executable instructions encoded thereon, which, when executed by at least one processor of a machine, cause the machine to perform operations comprising:
receive a markup language document from a network (220, 224, 400, 716, 720, 816, 820, 916, 920), the markup language document comprising an element (416) that retrieves additional data from at least one system connected to the network;
extract from the element (416) a link (422) to the additional data;
retrieve the additional data based on the link (B);
extract from the additional data an identifier associated with the additional data (518);
compare the identifier (522, 532) against a list of identifiers (522) stored locally on the machine to identify whether a match exists between the identifier and an identifier on the list of identifiers;
responsive to a match being identified, select at least one action to be performed based on the match (524); and
send decision data to a server (528) to inform the server of the at least one action.

Example 18

The machine-readable medium of example 17, wherein the decision data comprises the identifier.

Example 19

The machine-readable medium of example 17 or 18, wherein the decision data comprises an indication of user interest or disinterest in the additional data.

Example 20

The machine-readable medium of example 19, wherein responsive to sending the decision data, the server sends data selected based on the indication of user interest or disinterest.

Example 21

A method for reducing one or more of bandwidth, time, computing resources and power in a machine operating a browser, comprising:

receiving a markup language document from a network (220, 224, 400, 716, 720, 816, 820, 916, 920), the markup language document comprising a plurality of elements (402-424);

extracting, from an element (416) of the plurality of elements, at least one identifier (518);

comparing the at least one identifier (522, 532) to at least one list of identifiers (520) stored locally on the machine to identify whether a match exists between the identifier and at least one identifier on the at least one list of identifiers;

responsive to a match being identified, selecting at least one action to be performed based on the match (524), the action comprising at least one of removal of the element (606), removal of content associated with the element (608), relocation of the content associated with the element (610 and indicating an area of interest, an area of disinterest or both (612);

initiating implementation of the action and presenting results of the action using at least one user interface to a user (516); and sending at least an indication of the action to a system on the network (528).

Example 22

The method of example 21, wherein the at least one list is configured by the user, retrieved from an online storage location, obtained from a social networking profile of the user, or any combination thereof.

Example 23

The method of example 21 or 22, wherein the at least one action comprises removal of the element and the method further comprises:

modifying a document object model (DOM) derived from the document to remove the element from the DOM;

fixing remaining elements of the DOM to account for removal of the element; and wherein the indication informs the system on the network that the element was removed.

Example 24

The method of example 21, 22, or 23, wherein the at least one action comprises relocation of content associated with the element and the method further comprises:

identifying a new location for the content;

modifying one or more elements from a DOM to place the content at the new location; and wherein the indication informs the system on the network that the content was relocated.

Example 25

The method of example 21, 22, 23, or 24, wherein the at least one list of identifiers comprises an indication of priority associated with each identifier in the at least one list of identifiers.

Example 26

The method of example 21, 22, 23, 24, or 25, wherein the at least one action comprises indicating interest, disinterest, or both and the method further comprises:

selecting at least one of an area of interest and an area of disinterest; and wherein the indication comprises the area of interest, the area of disinterest or both.

Example 27

The method of example 26, wherein the element comprises a link that retrieves additional data from at least one system connected to the network and the method further comprises:

modifying the link from its original form by appending the area of interest, the area of disinterest or both, the indication comprising at least a portion of the modified link;

receiving from the system on the network, content selected in accordance with the area of interest, the area of disinterest or both.

Example 28

The method of example 21, 22, 23, 24, 25, 26, or 27, wherein the at least one action comprises removing content associated with the element but otherwise leaving the element intact.

Example 29

The method of example 21, 22, 23, 24, 25, 26, 27, or 28, wherein the element comprises a link that retrieves additional data from at least one system connected to the network and the method further comprises:

modifying the link from its original form by appending the area of interest, the area of disinterest or both, the indication comprising at least a portion of the modified link.

Example 30

The method of example 29, wherein the operations further comprise:

receive, in response to sending the at least a portion of the modified link, content selected by the server based on the at least a portion of the modified link.

Example 31

The method of example 29 or 30, wherein:

prior to sending the at least a portion of the modified link, the operations further comprise:

receive, from the server, content associated with the element; and wherein the at least a portion indicates that the received content has been blocked or moved.

Example 32

The method of example 21, 22, 23, 24, 25, 26, 27, 28, 29, 30, or 31, wherein the list of identifiers comprises purchase history for a user and wherein the at least a portion indicates at least one item in the purchase history.

Example 33

The method of example 21, 22, 23, 24, 25, 26, 27, 28, 29, 30, 31, or 32, wherein the identifier comprises a content type and wherein the list of identifiers comprises a list of content types to be blocked and wherein the at least a portion indicates a content type that matches the identifier associated with the content type.

Example 34

An apparatus comprising means to perform a method as in any preceding example.

Example 35

Machine-readable storage including machine-readable instructions, when executed, to implement a method or realize an apparatus as in any preceding example.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A method for reducing one or more of bandwidth, time, computing resources and power in a machine operating a browser, comprising:
   receiving a markup language document from a network, the markup language document comprising an element that retrieves additional data from a server connected to the network;
   extracting an identifier associated with the additional data from the element, from the additional data, or both;
   comparing the identifier to at least one list of identifiers stored locally on the machine to identify whether a match exists between the identifier and at least one identifier on the at least one list of identifiers;
   responsive to a match being identified, selecting at least one action to be performed based on the match, the action comprising at least one of:
      removal of the element;
      relocation of content associated with the element; and
      indicating an area of interest, an area of disinterest or both;
   initiating implementation of the at least one action;
   sending at least an indication of the selected at least one action to a second system on the network to inform the second system of the at least one action taken; and
   presenting results of the action using at least one user interface to a user.

2. The method of claim 1, wherein the at least one list is configured by the user, retrieved from an online storage location, obtained from a social networking profile of the user, or any combination thereof.

3. The method of claim 1 wherein the at least one action comprises removal of the element and the method further comprises:
   modifying a document object model (DOM) derived from the document to remove the element from the DOM;
   fixing remaining elements of the DOM to account for removal of the element; and
   wherein the indication informs the second system on the network that the element was removed.

4. The method of claim 1, wherein the at least one action comprises relocation of content associated with the element and the method further comprises:
   identifying a new location for the content;
   modifying one or more elements from a DOM to place the content at the new location; and
   wherein the indication informs the second system on the network that the content was relocated.

5. The method of claim 1 wherein the at least one list of identifiers comprises an indication of priority associated with each identifier in the at least one list of identifiers.

6. The method of claim 1, wherein the at least one action comprises indicating interest, disinterest, or both and the method further comprises:
   selecting at least one of an area of interest and an area of disinterest; and
   wherein the indication comprises the area of interest, the area of disinterest or both.

7. The method of claim 6, wherein the element comprises a link that retrieves additional data from the server and the method further comprises:
   modifying the link from its original form by appending the area of interest, the area of disinterest or both, the indication comprising at least a portion of the modified link;
   sending the indication to the server;
   receiving from the server, content selected by the server in accordance with the area of interest, the area of disinterest or both.

8. The method of claim 1, wherein the at least one action further comprises removing content associated with the element but otherwise leaving the element intact.

9. The method of claim 1 further comprising sending the indication to the server.

10. A computing system comprising:
   a processor and executable instructions accessible on a machine-readable medium that, when executed, cause the system to perform operations comprising:
      receive a markup language document from a network, the markup language document comprising an element that retrieves additional data from at least one system connected to the network;
      extract a link to the additional data from the element and an identifier associated with the additional data from the element, the additional data, or both;
      compare the identifier against a list of identifiers stored locally on the system to identify whether a match exists between the identifier and an identifier on the list of identifiers;
      responsive to a match being identified, select at least one action to be performed based on the match;
      creating a parameter indicating the at least one action;
      modify the link from its original form to incorporate the parameter; and send at least a portion of the modified link to a server to inform the server of the at least one action.

11. The system of claim 10, wherein the at least one action comprises at least one of removal of the element, removal of content associated with the element, relocation of content associated with the element, and indicating interest or disinterest.

12. The system of claim 10, wherein the operations further comprise:
receive, in response to sending the at least a portion of the modified link, content selected by the server based on the at least a portion of the modified link.

13. The system of claim 10, wherein:
prior to sending the at least a portion of the modified link, the operations further comprise:
receive content associated with the element from a second server;
sending the at least a portion to the second server; and
wherein the at least a portion indicates that the received content has been blocked or moved.

14. The system of claim 10, wherein the list of identifiers comprises purchase history for a user and wherein the at least a portion indicates at least one item in the purchase history.

15. The system of claim 10, wherein the identifier associated with the additional data comprises a content type and wherein the list of identifiers comprises a list of content types to be blocked and wherein the at least a portion indicates a content type that matches the identifier associated with the content type.

16. The system of claim 10, further comprising informing a second server of the at least one action taken.

17. A machine-readable medium having executable instructions encoded thereon, which, when executed by at least one processor of a machine, cause the machine to perform operations comprising:
receive a markup language document from a network, the markup language document comprising an element that retrieves additional data from at least one system connected to the network;
extract a link to the additional data from the element;
extract identifier associated with the additional data from the element, from the link, from the additional data, or from any combination thereof;
compare the identifier against a list of identifiers stored locally on the machine to identify whether a match exists between the identifier and an identifier on the list of identifiers;
responsive to a match being identified, select at least one action to be performed based on the match; and
creating a parameter indicating at least one action taken with respect to the additional data;
modify the link from its original form to incorporate the parameter, thereby creating a modified link; and
send the modified link to a server to inform the server of the at least one action.

18. The machine-readable medium of claim 17, further comprising sending the modified link to a second system.

19. The machine-readable medium of claim 18, wherein the parameter comprises an indication of user interest or disinterest in the additional data.

20. The machine-readable medium of claim 19, wherein responsive to sending the modified link, the second system sends data selected based on the indication of user interest or disinterest.

* * * * *